US010636067B2

(12) United States Patent
Collins

(10) Patent No.: US 10,636,067 B2
(45) Date of Patent: Apr. 28, 2020

(54) SYSTEM AND METHOD FOR AN INMATE PRIVILEGE KIOSK

(71) Applicant: KEEFE COMMISSARY NETWORK, L.L.C., St. Louis, MO (US)

(72) Inventor: Christopher M. Collins, O'Fallon, MO (US)

(73) Assignee: KEEFE COMMISSARY NETWORK, L.L.C., St. Louis, MO (US)

( * ) Notice: Subject to any disclaimer, the term of this patent is extended or adjusted under 35 U.S.C. 154(b) by 0 days.

(21) Appl. No.: 16/353,011

(22) Filed: Mar. 14, 2019

(65) Prior Publication Data

US 2020/0082445 A1    Mar. 12, 2020

Related U.S. Application Data

(63) Continuation of application No. 13/720,127, filed on Dec. 19, 2012, now Pat. No. 10,275,811, which is a continuation of application No. 11/855,309, filed on Sep. 14, 2007, now Pat. No. 8,370,206.

(51) Int. Cl.
*G06Q 30/00*  (2012.01)
*G06Q 30/06*  (2012.01)
*G06Q 10/00*  (2012.01)
*G06Q 50/26*  (2012.01)

(52) U.S. Cl.
CPC ......... *G06Q 30/0601* (2013.01); *G06Q 10/00* (2013.01); *G06Q 50/26* (2013.01)

(58) Field of Classification Search
CPC ..... H04L 63/10; H04L 63/101; H04L 63/102; H04L 63/105; H04L 63/107; G06Q 30/0601; G06Q 10/00; G06Q 50/26
See application file for complete search history.

(56) References Cited

U.S. PATENT DOCUMENTS

| | | |
|---|---|---|
| 5,485,507 A | 1/1996 | Brown et al. |
| 5,920,848 A | 7/1999 | Schutzer et al. |
| 5,937,393 A | 8/1999 | O'Leary et al. |
| 6,208,974 B1 | 3/2001 | Campbell et al. |
| 6,587,822 B2 | 7/2003 | Brown et al. |
| 6,611,275 B1 | 8/2003 | Zey et al. |
| 7,076,032 B1 | 7/2006 | Pirasteh et al. |
| 7,180,985 B2 | 2/2007 | Colson et al. |
| 7,337,123 B2 * | 2/2008 | Dvorak ............... G06F 19/3418 705/7.19 |
| 7,519,169 B1 | 4/2009 | Hingoranee et al. |

(Continued)

OTHER PUBLICATIONS http://www.a-t-g.com/pr/CorforumArticle.pdf (Year: 2006).*

(Continued)

*Primary Examiner* — Matthew E Zimmerman
(74) *Attorney, Agent, or Firm* — Armstrong Teasdale LLP

(57) ABSTRACT

A method of administrating inmate privileges in a correctional facility using a computer kiosk is provided. The method includes accepting data and information corresponding to inmate privileges for an inmate population, the data and information including restrictions on the inmate privileges. The method also includes accepting requests for privileges by an inmate, applying the restrictions to the accepted requests, and visually presenting information to the inmate regarding accepted requests.

23 Claims, 26 Drawing Sheets

(56) References Cited

U.S. PATENT DOCUMENTS

| | | | |
|---|---|---|---|
| 7,640,190 B1 * | 12/2009 | Sullivan | G06Q 30/0601 |
| | | | 379/114.01 |
| 7,685,632 B2 | 3/2010 | Vayman | |
| 2002/0034978 A1 | 3/2002 | Legge et al. | |
| 2003/0061087 A1 * | 3/2003 | Srimuang | G06Q 10/06314 |
| | | | 705/7.18 |
| 2003/0065805 A1 | 4/2003 | Barnes, Jr. | |
| 2004/0128211 A1 | 7/2004 | Tsai | |
| 2004/0225887 A1 | 11/2004 | O'Neil et al. | |
| 2005/0080650 A1 | 4/2005 | Noel | |
| 2005/0259801 A1 | 11/2005 | Bullard et al. | |
| 2006/0106738 A1 * | 5/2006 | Schleicher | G07B 17/00435 |
| | | | 705/401 |
| 2006/0126803 A1 | 6/2006 | Patel et al. | |
| 2007/0067301 A1 * | 3/2007 | Malik | G06F 21/10 |
| 2008/0109262 A1 | 5/2008 | Dvorak et al. | |
| 2009/0076823 A1 | 3/2009 | Collins | |

OTHER PUBLICATIONS

Jul. 2006—http://www.a-t-g.com/pr/CorforumArticle.pdf (Year: 2006).

Office Action dated Dec. 6, 2010, U.S. Appl. No. 11/855,447, filed Sep. 14, 2007; 30 pages.

* cited by examiner

FIG. 17

SYSTEM AND METHOD FOR AN INMATE PRIVILEGE KIOSK

CROSS REFERENCE TO RELATED APPLICATIONS

This application is a continuation application of U.S. patent application Ser. No. 13/720,127 filed Dec. 19, 2012 which is a continuation application of U.S. patent application Ser. No. 11/855,309 filed Sep. 14, 2007 and now issued U.S. Pat. No. 8,370,206, the complete disclosures of which are hereby incorporated by reference in their entirety.

BACKGROUND OF THE INVENTION

This invention relates generally to administrative systems for institutional facilities, and more specifically to interactive methods and systems for administering inmate privileges in incarceration facilities.

A variety of incarceration or correctional facilities exist in which a population of persons, commonly referred to as prisoners or inmates, are confined. Such facilities may be operated by state, local, and federal government entities, and may serve inmate populations of various sizes. The incarceration facility environment is subject to a number of unique administrative challenges.

For example, incarceration facilities demand a level of oversight that is not present in most other environments. Activities of inmates must be carefully monitored, and approved in advance, by facility administrators. Various types of restrictions to specified activities exist as security safeguards and as a means to promote desirable behavior among inmates, while privileges to other activities may be granted and revoked by the correctional facility. One popular privilege offered by many incarceration facilities is a commissary wherein inmates may purchase a variety of goods using spending accounts. The operating details associated with such commissaries, however, can present significant burdens on administrators of correctional facilities. Such burdens may include, as examples only, aspects of the financial accounting and management of the inmate accounts, correct determination and application of potentially a large number of different restrictions that may vary considerably from inmate to inmate, dissemination of up to date facility information and announcements regarding available privileges, and communication to inmates desiring such privileges regarding applicable restrictions.

Similar burdens in monitoring and applying inmate restrictions may arise in other contexts as well, such as in the processing of inmate requests for privileges such as inmate activities and appointments, including family visits and appointments with a doctor.

Improvements in monitoring and administering inmate privileges, and disseminating and communicating information regarding the same, are desired.

BRIEF DESCRIPTION OF THE INVENTION

In one embodiment, a method of administrating inmate privileges in a correctional facility using a computer kiosk is provided. The method includes accepting data and information corresponding to inmate privileges for an inmate population, the data and information including restrictions on the inmate privileges. The method also includes accepting requests for privileges by an inmate, applying the restrictions to the accepted requests, and visually presenting information to the inmate regarding accepted requests.

Optionally, accepting requests for privileges by an inmate includes accepting an order for a commissary good. The method of administrating inmate privileges may further include accepting requests with a screen display, the screen display including an inmate financial account information summary section. The method of administrating inmate privileges may further include generating a detailed transaction history for review by the inmate. Furthermore, the data and information corresponding to inmate privileges may include data and information relating to commissary goods, and the method may include presenting commissary good categories to the inmate via a screen display.

Optionally, the method of administrating inmate privileges may further include: displaying a detailed selection screen for each of the commissary good categories as they are selected by the user; displaying a quantity selection display for the items of the detailed selection screen when selected by a user; presenting an order summary section; presenting an edit order display; and presenting a delete order display.

Optionally, accepting requests for privileges may include accepting a request for an appointment. Accepting requests for privileges may further include presenting an appointment calendar to the inmate, presenting a submit request for appointment display, presenting a review request display, and presenting status information for each request. Presenting status information may include presenting status identifiers including at least one of pending status, approved status, or cancelled status. The method of administrating inmate privileges may further include displaying facility information to the inmate.

In another embodiment, a network-based system for processing requests for privileges by an inmate in a correctional facility is provided. The system includes a client system comprising a browser, a database for storing information, and a server system adapted to be coupled to the client system and the database. The server is further adapted to accept requests for privileges by an inmate, apply facility restrictions to accepted requests, and present information to the inmate regarding accepted requests.

Optionally, the server of the network-based system may be further adapted to display a status of submitted requests for privileges by the inmate and to present selection information in a screen display to request the privileges. The screen display may include a selection section for one of a transaction history for the inmate making the requests, a commissary order selection, a request appointment selection, and a facility information selection.

Optionally, the server may be further adapted to: balance an inmate's financial account as requests for privileges are accepted and display account information to the inmate; display detailed transaction history, the transaction history including deposits to the account and payments made from the account; and prompt selection of a privilege request by a user.

Optionally, the server may also be adapted to display a selection screen for commissary goods, and accept orders for commissary goods. The server may be adapted to display a summary screen of commissary good categories to the inmate and to display a detailed order screen for each commissary good category. The server may also be adapted to: present graphical icons for each commissary good offered by the commissary; accept a request for an appointment by the inmate; present an appointment calendar to the inmate; indicate an appointment request as one of pending, approved, and cancelled; display information regarding facility privileges to the inmate; edit a submitted request for a privilege; and delete a submitted request for a privilege.

In yet another embodiment, a computer program embodied on a computer readable medium for processing a request for a privilege by an inmate of a correctional facility is provided. The program includes at least one code segment that receives inmate provided selections for privileges, and, in response to the received selections, applies privilege restrictions of the correctional facility to the request for privilege, and displays status information for the submitted request.

Optionally, the computer program may further include at least one code segment that displays a commissary good category selection screen, at least one code segment that displays a detailed commissary good selection screen, at least one code segment that displays an inmate's financial account information as requests for privileges are received, at least one code segment that displays a detailed transaction history including account deposits and payments, at least one code segment that displays a request for appointment screen, and at least one code segment that displays a request for appointment status screen. The request for appointment status may include one of an accepted status, a pending status, or a cancelled status. The computer program may further include at least one code segment that displays an appointment calendar and at least one code segment that displays a correctional facility information screen.

BRIEF DESCRIPTION OF THE DRAWINGS

FIGS. 6-9 illustrate portions of the algorithm of FIG. 5 utilized by the system shown in FIGS. 1 and 2 to administer inmate privileges, wherein:

FIG. 6 illustrates a transaction history algorithm;

FIG. 7 illustrates a commissary selection processing algorithm;

FIG. 8 illustrates an appointment processing algorithm; and

FIG. 9 illustrates a facility information presenting algorithm.

FIGS. 10-26 illustrate exemplary embodiments of a user interface for the system shown in FIGS. 1 and 2, wherein:

FIG. 10 is an example embodiment of a user interface displaying a language selection screen for a user of the system;

FIG. 11 is an example embodiment of a user interface displaying an instruction screen for a user of the system;

FIG. 12 is an example embodiment of a user interface displaying an identification entry screen for a user of the system;

FIG. 13 is an example embodiment of a user interface displaying a password entry screen for a user of the system;

FIG. 14 is an example embodiment of a user interface displaying a main menu screen for a user of the system;

FIG. 15 is an example embodiment of a user interface displaying an account history screen for a user of the system;

FIG. 16 is an example embodiment of a user interface displaying a category selection screen for a user of the system;

FIG. 17 is an example embodiment of a user interface displaying an item selection screen for a user of the system;

FIG. 18 is an example embodiment of a user interface displaying a quantity selection screen for a user of the system;

FIG. 19 is an example embodiment of a user interface displaying a selected order editing screen for a user of the system;

FIG. 20 is an example embodiment of a user interface displaying a selected order deletion screen for a user of the system;

FIG. 21 is an example embodiment of a user interface displaying an appointment calendar screen for a user of the system;

FIG. 22 is an example embodiment of a user interface displaying an appointment review screen for a user of the system;

FIG. 23 is an example embodiment of a user interface displaying an appointment request submission screen for a user of the system;

FIG. 24 is an example embodiment of a user interface displaying a facility information main screen for a user of the system;

FIG. 25 is an example embodiment of a user interface displaying a facility information screen for a user of the system; and FIG. 26 is an example embodiment of a user interface displaying a new password entry screen for a user of the system.

DETAILED DESCRIPTION OF THE INVENTION

Figure 1:
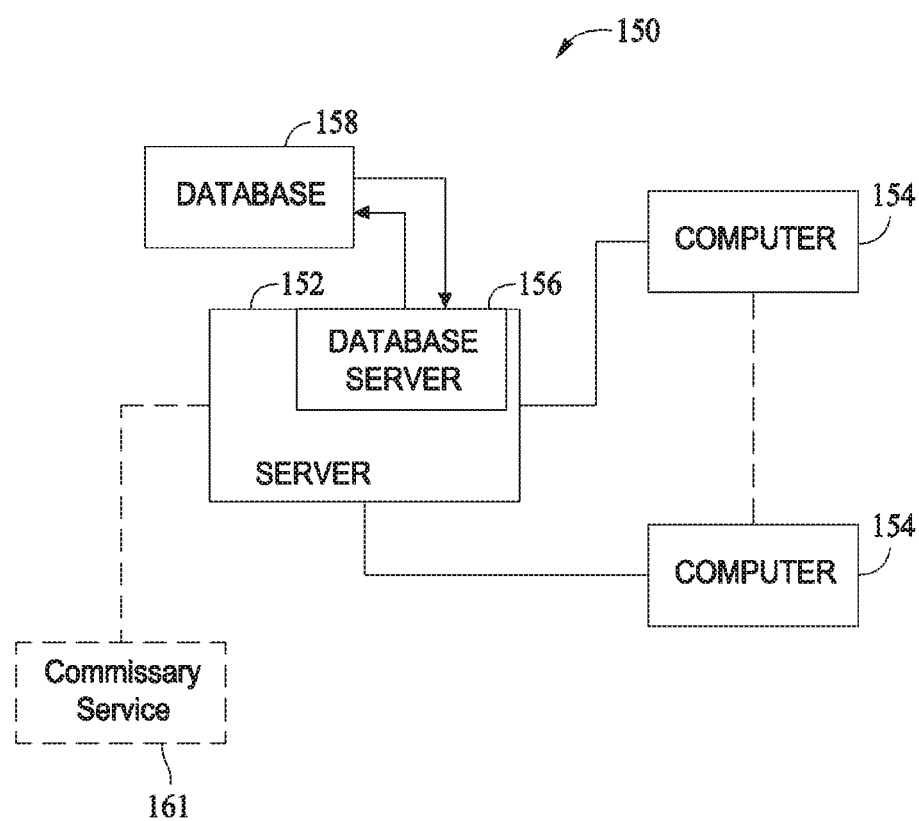
FIG. 1 is a simplified block diagram of an exemplary embodiment of a kiosk-based system for inmate privilege administration.

Exemplary embodiments of interactive methods and systems for administering privileges of inmate populations in correctional facilities are disclosed hereinbelow. In various aspects the inventive methods and systems advantageously facilitate management of financial accounts of inmates and prisoners and provide access for inmates to obtain complete information regarding their accounts, facilitate efficient processing of orders for commissary goods and abiding by applicable restrictions for the members of an inmate population, facilitate efficient processing and approval or requests for privileges such as appointments and activities for inmates, and facilitate efficient and timely dissemination of information to an inmate population.

In order to appreciate the invention to its fullest extent, the following disclosure will be divided into different parts or segments, wherein Part I discusses particular problems associated with administration of incarceration facilities; Part II discloses an exemplary system for addressing the problems discussed in Part I; Part III discloses exemplary processes utilized by the system of Part II to achieve its advantages; and Part IV discusses exemplary systems and user interfaces implementing the systems and processes disclosed in Parts II and III.

I. Introduction to the Invention

Many correctional facilities offer commissary services, among other privileges, which are accessible to inmates and prisoners. The commissary services allow inmates and prisoners to purchase a variety of goods using inmate accounts that may be funded, for example, by the inmates themselves, or by friends and relatives of the inmates. Items ranging from food and beverage items to personal hygienic items, and even entertainment items and electric devices, may be ordered from commissary facilities that may be locally based on-site at the correctional facility or remotely located.

Historically, available items have been presented to the inmates using hard copy catalogues and the like, and orders for goods and services were entered by hand on paper by a commissary representative using standardized order forms, with the paper order forms typically being forwarded to another person or persons for approval and processing. Such paper-based transaction systems are slow and inefficient, especially for larger inmate populations having significant turnover and change of individuals in the population.

Additionally, certain of the inmates may be restricted, on an individual or group basis, from obtaining certain items through the commissary. Access to the commissary, or to certain types of the goods offered by the commissary, is typically deemed a revocable privilege by the correctional or incarceration facility. For example, inmate restrictions to commissary goods may be permanently assigned for security reasons or for health reasons to certain types of prisoners, as determined by each correctional facility on an individual or class basis. Other restrictions may be applicable for indefinite time periods, but are not necessarily permanent such that it is possible at some point that inmates may be assigned a different set of restrictions, either more or less restrictive than before. Still other restrictions may be more temporary in nature and may be applied for relatively short time periods in response to, for example, undesirable behavior of inmates, violations of facility rules, or for other non-disciplinary reasons. Permanent, indefinite, and temporary restrictions may exist for an inmate at any given time, and accurately tracking and applying the current state of restrictions for each inmate as commissary orders are made, especially for large inmate populations, is cumbersome.

At least in part to address such concerns, automated computer-implemented systems have been developed wherein inmates may order commissary goods using a telephone interface. Paper processing of orders may therefore be eliminated in favor of electronic processing, and restrictions may be applied electronically instead of manually. Known systems of this type, however, are not completely satisfactory from the perspective of either the inmate populations or the administrators of the correctional facilities.

For example, using known automated systems and interfaces for prison commissary systems, inmates have a limited ability to obtain information regarding their spending accounts, and administrators may not have ready access to such information to answer inmate questions. Inmates are typically provided only an account balance at the time that goods are ordered from the commissary. Inmates may often desire further information, in the form of account history records showing deposits and withdrawals or debits to the account, to check the accuracy of the balance reported by existing systems, but generally lack the ability to obtain such information at the time of potential purchases, if at all. This situation can be particularly frustrating in circumstances when the system reports an inadequate balance to make a desired purchase, often to the user inmate's surprise, but leaves no opportunity to review whether the reported balance is accurate or otherwise allow the inmate to track account deposits or withdrawals.

Also, when ordering goods from a correctional facility commissary using existing automated telephone systems, inmates must typically obtain item numbers from a hardcopy catalog or other source that may or may not be up to date or complete. In the case of outdated catalogues and the like, inmates may enter the correct item number according to the catalogue only to have the system report that the item number is invalid, or may enter a product code for one item that remains valid on the system but actually corresponds to another item. Also, items may be available on the system that the inmate cannot see in an outdated catalogue or a current catalogue with one or more pages removed.

Because orders are made through a phone interface using numeric product codes and the relatively small numeric keypad of the phone, it is quite easy to misread numeric product codes and/or to mistakenly enter an incorrect product code when ordering items. Moreover, such mistakes are not always easy to detect or correct by the inmate at the time of ordering or alternatively to detect and correct by the facility. Similar mistakes may also easily occur when entering desired item quantity information for desired items via the numeric keypad of the phone. Also, orders made through known systems may be denied, correctly or incorrectly, without explanation to the inmate, leading to further questions and concerns that administrators must address.

Facility administration of requests for services, activities, and appointments presents additional challenges. Such requests, appointments and activities are often requested in a written document and must typically be approved by certain persons, resulting in some period of time and delay between the making of a request, receipt of the request by the appropriate person or persons, and a decision being made upon the request. Activities and appointments may be affected by inmate restrictions as discussed above, which may be the same or different restrictions that apply to commissary orders. Anxious inmates are often uncertain regarding the status of submitted requests for activities and appointments, and may not recall which requests they have actually submitted for approval. In some instances, administrators may likewise be unaware of pending requests or their status. Confusion that may result on both the inmate side and the administrator side for such requests is undesirable.

Finally, accurate and timely dissemination of facility information and notices to inmate populations can be challenging. Posted message boards and the like in public hallways, entryways, gathering rooms, etc., may quickly become outdated, illegible, difficult to remember, or unhelpful to many prisoners. Hardcopy paper materials disseminated to the prisoners may not be effective either if the prisoners discard or lose the paper notices or, if for various reasons, certain of the prisoners fail to receive paper notices altogether.

II. Exemplary Systems of the Invention

FIGS. 1-9 illustrate aspects of an exemplary inmate privilege administration system 150, that in one embodiment is a computer program or software embodied on a computer readable medium and utilizing, for example, a Structured Query Language (SQL) with a client user interface front-end for administration and a web interface for user input, access, and information retrieval and reports The privilege administration system 150 may be web enabled and may be run on a business-entity intranet or alternatively may be fully accessed by individuals having an authorized access outside the firewall of the business-entity through the Internet. In an exemplary embodiment, the system 150 may be run in a Windows® NT environment or operating system that is commercially available from Microsoft Corporation of Redmond, Wash. The application may be flexible and designed to run in various different environments without compromising any major functionality.

FIG. 1 is a simplified block diagram of an exemplary embodiment of the system 150 including a server system 152, and a plurality of client sub-systems, also referred to as client systems 154, connected to the server system 152. Computerized modeling and grouping tools, as described below in more detail, are stored in the server system 152 and can be accessed by a requester at any one of the client systems 154. In one embodiment, the client systems 154 are computers or other electronic devices including a web browser, such that the server system 152 is accessible to the client systems 154 using, for example, the Internet.

The client systems 154 may be interconnected to the Internet through many interfaces including, for example, a network such as a local area network (LAN) or a wide area network (WAN), dial-in-connections, cable modems and special high-speed ISDN lines. The client systems 154 may be any device capable of interconnecting to the Internet including a web-based phone, personal digital assistant (PDA), or other web-based connectable equipment or equivalents thereof. The ability to connect to the Internet allows client systems 154 to be remotely located from the server 152, such as, at a correctional facility. A database server 156 is connected to a database 158 containing information on a variety of matters, as described below in greater detail. In one embodiment, the database 158 is centralized and stored on the server system 152, and the database 158 may be accessed by potential users at one of the client systems 154 by logging onto the server system 152 through one of the client systems 154. In an alternative embodiment, the database 158 may be stored remotely from server system 152 and may be non-centralized.

Figure 2:
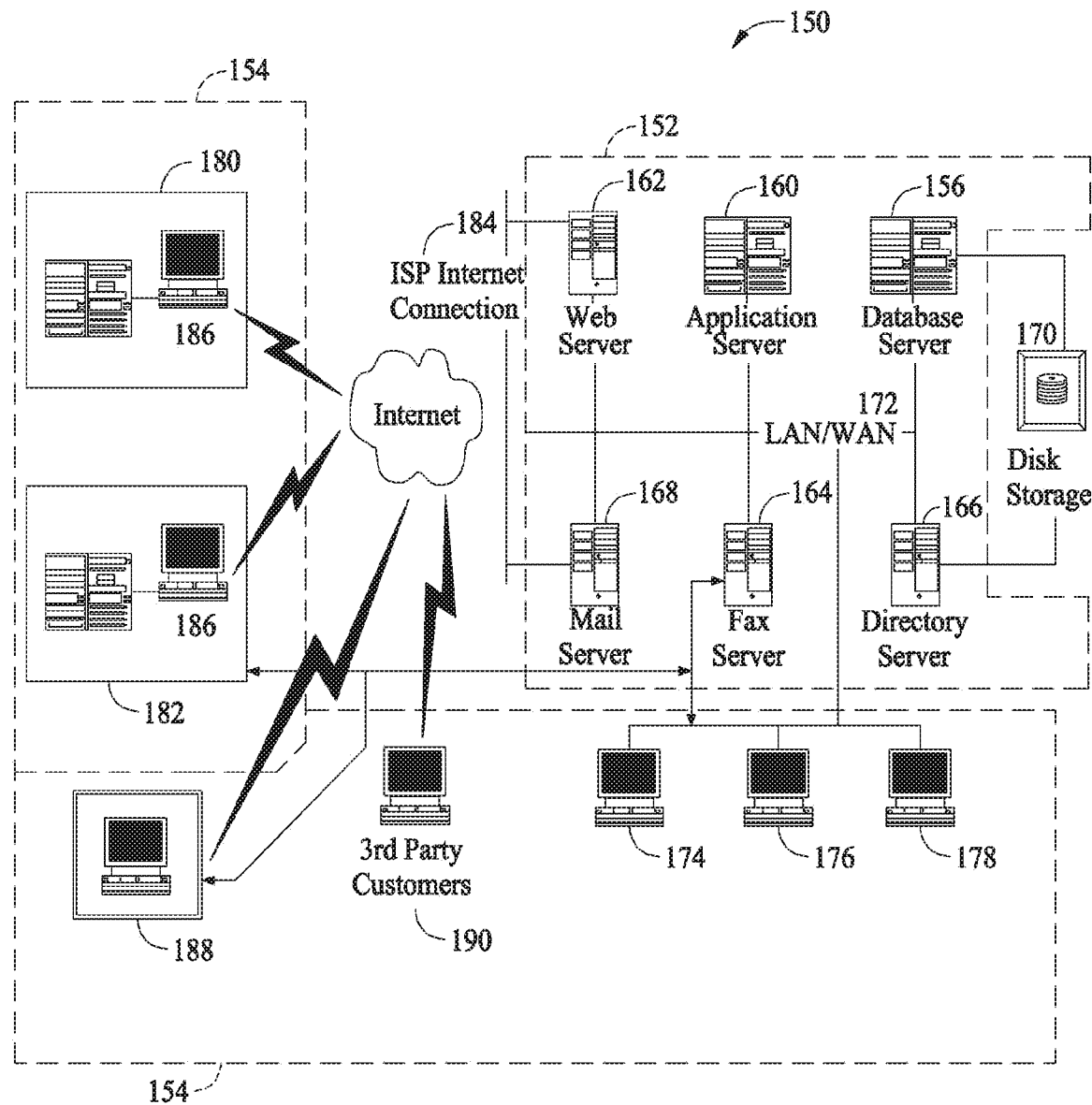
FIG. 2 is an expanded block diagram of an exemplary embodiment of a server architecture of the system shown in FIG. 1.

FIG. 2 is an expanded block diagram of an exemplary embodiment of a server architecture of the system 150 including the server system 152 and the client systems 154. The server system 152 may include the database server 156, an application server 160, a web server 162, a fax server 164, a directory server 166, and a mail server 168. A disk storage unit 170 may be coupled to the database server 156 and the directory server 166. The servers 156, 160, 162, 164, 166, and 168 may be coupled in a local area network (LAN) 172. In addition, a system administrator's workstation 174, a user workstation 176, and a supervisor's workstation 178 may be coupled to the LAN 172. Alternatively, workstations 174, 176, and 178 may be coupled to LAN 172 using an Internet link or are connected through an intranet.

Each workstation 174, 176, and 178 may be a personal computer or other electronic device having a web browser. Although the functions performed at the workstations typically are illustrated as being performed at respective workstations 174, 176, and 178, such functions may be performed at one of many personal computers coupled to the LAN 172. Workstations 174, 176, and 178 are illustrated as being associated with separate functions only to facilitate an understanding of the different types of functions that can be performed by individuals having access to the LAN 172.

The server system 152 in one embodiment is configured or adapted to be communicatively coupled to various individuals via some of the client systems 154, including employees 180 associated with the system 150, and to third parties 182 in communication with the server system 152 using, for example, an ISP Internet connection 184. The communication in the exemplary embodiment is illustrated as being performed using the Internet, however, any other wide area network (WAN) type communication can be utilized in other embodiments. That is, the system 150, and its operating algorithms and processes described below are not limited to being practiced using the Internet.

In an exemplary embodiment, any authorized individual having a workstation 186, 188 can access the server system 152 via one of the client systems 154. At least one of the client systems 154 includes a manager workstation 188 located at a remote location. Workstations 186 and 188 may be personal computers or other electronic devices having a web browser. Workstations 186 and 188 may also be kiosks, in one example embodiment, similar to airline kiosks located within airports that allow passengers to check-in and print their own boarding passes without the assistance of an airline employee. The stand-alone kiosk may include a display screen to provide information to a user, and also may include an input device, such as a keyboard, a mouse, or a touch screen, positioned at least partially within a protective casing. In exemplary embodiments, a touch screen is a preferred input device compared to a mouse or a keyboard because a touch screen is more rugged, and less prone to damage than a mouse or a keyboard. Additionally, third party customers may communicate with the server system 152 via a workstation 190 having, for example, a web browser.

The fax server 164 may communicate with remotely located client systems 154, including the workstations 186, 188 and 190. The fax server 164 may be configured or adapted to communicate with other client systems including but not limited to the workstations 174, 176 and 178 as well for reporting purposes.

The functionality and programming of the system is explained in detail below with respect to the methods and processes described below in Part III, and the user interface described below in Part IV.

III. Exemplary Methods of the Invention

The technical effect of the processes and systems described herein is achieved when data and selections pertaining to commissary selections or privilege requests are supplied to and accepted by the privilege administration system 150. The data and selections used by the system 150 may be supplied to and accepted by any of the workstations connected to the server system 152 as described above, or may be supplied from other sources if desired. Exemplary data and selections utilized by the system are described in some detail below.

The data and selections supplied to the system 150 may be stored or archived in the aforementioned server system 152, and the data and selections may be accessed by the system 150 to permit a reliable placement of commissary orders and/or request for privileges in a reduced amount of time and labor, while substantially avoiding and eliminating human error.

The processes utilized in the system 150 will now be explained using the example embodiment of the privilege administration system 150 of FIGS. 1 and 2.

Figure 3:
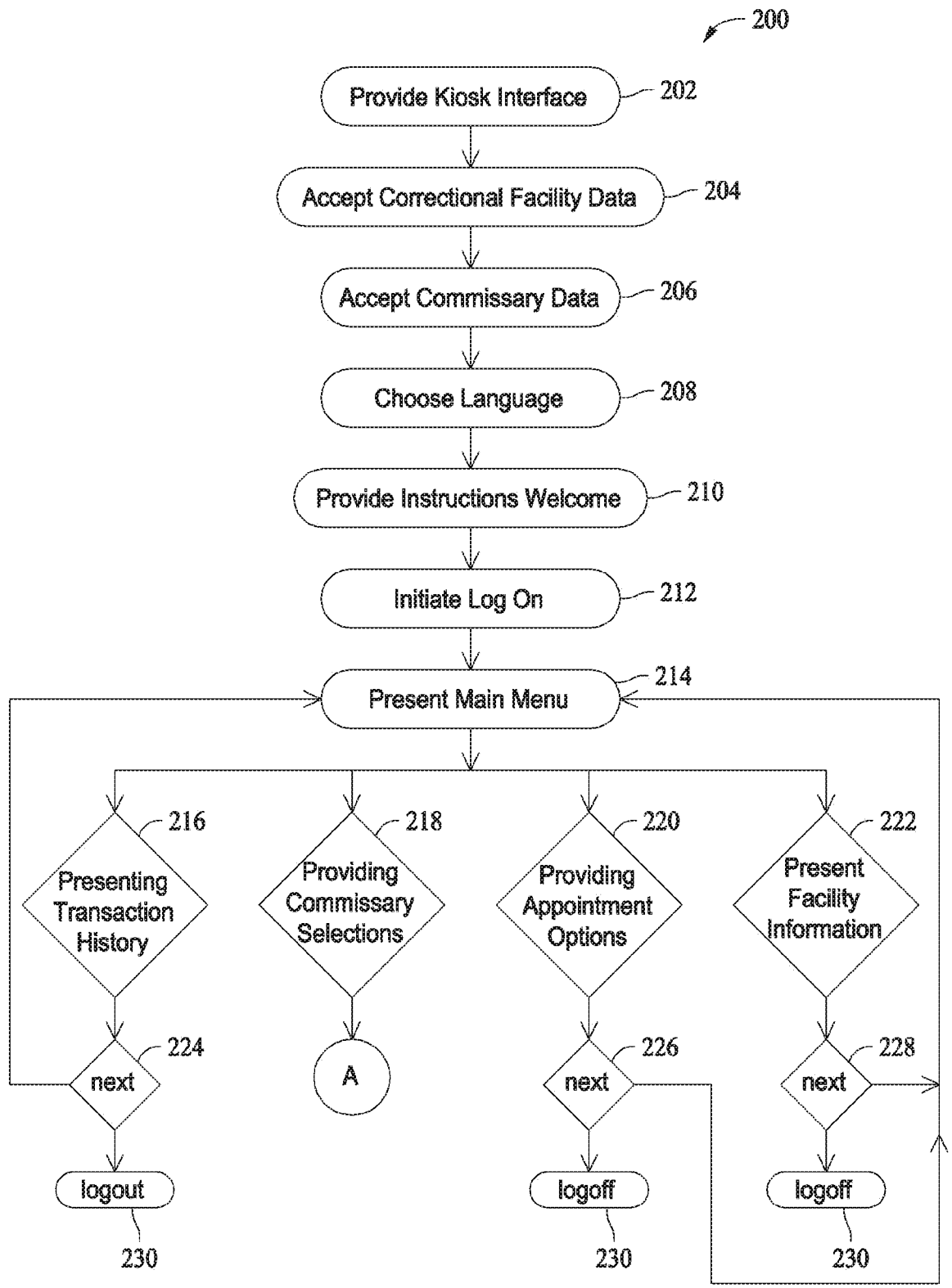
FIG. 3 is a method flowchart of processes executed by the system shown in FIG. 1.

FIG. 3 is a method flowchart of exemplary privilege administration processes 200 that may be executed by the privilege administration system 150 shown in FIGS. 1 and 2. The privilege administration processes 200 may begin by providing 202 a correctional facility-side privilege administration system and connecting the correctional facility-side to the server-side through the system. Also preparatory to operation of the system, certain data and information is supplied to the system in steps 204 and 206, wherein data and information for the correctional facility and for the commissary service, respectively, is collected and accepted by the system.

The correctional facility data and information may include, for example only, inmate identifiers and passwords used to access the system and to track orders and purchases by inmates, inmate profiles and contact information, addresses for delivery of ordered items, inmate spending account numbers and details, correctional facility identifiers and contact information, data and information pertaining to correctional facility restrictions to purchases and other privileges for each inmate, information related to inmate schedules, information related to facility schedules and events, and other data pertinent to the system. The correctional facility data and information may be appropriately grouped and may be transferred to the system from the correctional facility or from a remote location.

Correctional facility restrictions to commissary purchases and other privileges may include, among other things, item restrictions and quantity restrictions for goods offered by the commissary, and restrictions on availability of appointments for privileges such as classes and recreational time. Item restrictions and quantity restrictions may be made within the discretion of the facility. For example, the commissary may potentially offer a vast selection of items, with the facility designating only a portion of the items as approved by the facility for purchase by inmates, with no inmate being able to purchase a non-approved item. Item restrictions may further be instituted to prevent or prohibit selected inmates from ordering or receiving certain items while allowing other inmates to order or receive the same items. Quantity restrictions may be instituted for orders of certain items that are unobjectionable within specified quantity limits.

Item and quantity restrictions may be determined by the correctional facility on a class basis or an individual basis. For example, a class-based restriction may be defined in whole or in part based upon factors such as gender, age, and health of an inmate. In this manner, and as examples only, male inmates may be prevented from purchasing female clothing items through the use of appropriate restrictions, younger inmates may be prevented from ordering certain items that are available to older inmates, and diabetics may be prevented from ordering certain foods that may raise health issues. Class-based item and quantity restrictions may also be based on monetary considerations, wherein the correctional facility may place different spending limits on different inmates depending upon their ability to pay for ordered items. Still further, class-based restrictions may also relate to inmate status such as violent or non-violent offender status or for other security reasons. Other class-based restrictions are possible and are within the discretion of the facility.

Individual-based restrictions may be applied by the correctional facility in response to specific behavior by an inmate or in response to other events. For example, in response to vandalism in the correctional facility, inmates responsible for the vandalism may be restricted or suspended from ordering from the commissary altogether for a period of time, or may be restricted from ordering certain items that, absent the vandalism event and associated restrictions that have been applied in consequence thereof, the inmate would otherwise be able to purchase. Individual-based restrictions may also be adopted by the correctional facility to address specific violations of facility rules, or for other reasons including health and well being of specific inmates. For example, restrictions to prevent ordering of certain foods and items that an inmate is known to have allergic reactions to may be appropriate. As yet another example, restrictions may be removed as a reward to certain behaviors or events, and may be applied on an individual basis for the correctional facility to motivate and provide incentives to certain types of conduct. Other individual-based restrictions are possible and are within the discretion of the correctional facility.

It is contemplated that the correctional facility could implement restrictions to commissary purchases entirely on a class basis, entirely on an individual basis, or with a blend of class-based and individual-based restrictions. Regardless, the restrictions may be assigned codes and identifiers that are recognized by the system for appropriate processing of orders submitted by inmates. A large number of different restrictions may be accommodated by the system to capably accommodate large inmate populations and correctional facilities having different needs.

Individual and class-based restrictions may be permanent, indefinite, or temporary in nature. For example, a gender-based restriction would be permanent in nature. An offense-based inmate status as violent or non-violent may be indefinite and subject to change at some point in time. Behavior-based restrictions would be temporary and would usually expire in a relatively short period of time. Any changes in correctional facility restrictions, or assignment of restrictions to an inmate class or to individual inmates, may be input to and accepted by the system as part of the step 204 in more or less real time as changes, adjustments, and assignments of correctional facility restrictions are made. Also, inmate information changes and adjustments in the correctional facility data and information are considered to be an ongoing part of the step 204 as inmates are brought into the correctional facility, released from the correctional facility, or transferred to another facility. Changes and updates to the correctional facility data and information would also be appropriate upon death of an inmate, transfer of inmates to new or different cells or locations in the correctional facility, or for new hires or assignment of different facility administrators to oversee the commissary service.

The information related to inmate schedules may include dates and times of inmate commitments, possibly organized in a calendar view. For example, the calendar view may show the dates and times of an inmate's scheduled commitments for a one month period. In another example, the calendar view may show the dates and times of an inmate's scheduled commitments for a one week period. Inmate commitments may include, but are not limited to, meals, exercise periods, educational classes, therapy sessions, and religious services.

The information related to facility schedules and events may include dates and times that facility privileges are available for inmates to request. The facility privileges may include, but are not limited to, haircuts, library time including legal research, visitation, additional exercise periods, and additional educational classes. The information related to facility schedules and events may further include, but is also not limited to, information related to meals including menus, announcements of special events, and announcements of new items now available from the commissary. Announcements of special events may include construction within the facility, concerts or performances available to the inmates, group activities available to the inmates, and reminders of upcoming holidays.

The data and information for the commissary service accepted at step 206 may include, as examples only, product codes and identifiers for items offered by the commissary, product descriptions for each item offered by the commissary, price information for each item offered by the commissary service, manufacturer and supplier information items offered by the commissary service, accounting information for the sale of commissary items, spending account information for each inmate that is eligible to use the commissary service, the spending account information including a detailed transaction history, inventory information and location of inventoried items that are available for purchase, and routing and contact information for delivery of accepted orders for items. Other information pertinent to the commissary service may also be collected and accepted by the system, and like the correctional facility data and information, the commissary data and information may be subject to ongoing update and change as part of the step 206. For example, the introduction of new commissary items, elimination of existing commissary items, and price changes in any current item in the commissary item lineup, would necessitate acceptance of updated commissary data and information at step 206.

The detailed transaction history accepted by the system at step 206 may include, but is not limited to, a transaction description, a transaction type, the date each transaction either occurred or was recorded, a transaction amount, and a spending account balance accounting for each transaction. Transactions included in the detailed transaction history may include, deposits into an inmate's spending account and deductions from an inmate's spending account including, but not limited to, deductions to pay for vandalism, deductions to pay for commissary purchases, deductions to pay for medical services, and deductions to pay for telephone calls. Transaction types may include, but are not limited to, vandalism, purchases, cash deposits, and medical.

Once the requisite data and information is accepted by the system at steps 204 and 206, the system may proceed to offer a user a language selection and accept a language selection input at step 208. At step 208, the system prompts the user to make a language selection for interacting with the system, such as prompting the user to touch a portion of a touch screen indicated as corresponding to either an English selection or a Spanish selection. The selected language will be used in all further prompts provided by the system to a user. That is, in one embodiment, the system is configured to provide prompts in more than one language to accommodate the preferences of different users, although this is by no means required and may be omitted in another embodiment of the invention.

At step 208, the language of the prompts used by the system is swapped, if necessary, in response to the inmate's response to the system at step 208. That is, following the illustrated example, in FIG. 3, if the inmate selects English, for example by pressing a particular area on a touch screen, prompts in the English language are used, while if the inmate presses a particular area on the touch screen that corresponds to selecting Spanish, the system provides prompts in the Spanish language.

After any necessary swapping of responses at step 208, a welcome message and/or instructional message may be presented to the inmate at step 210. The privilege administration processes 200 may also include a log on and initialization script portion and processes 212 that may be embodied in the privilege administration system.

At step 212 the system prompts the user to enter an identification number provided by the correctional facility or the commissary service for interacting with the privilege administration system. The identification number may match an inmate identification number used for other purposes at the correctional facility, or may be a specifically provided identification number for use with the privilege administration system. The identification number may include as many digits as the correctional facility or the commissary chooses.

In an exemplary embodiment, the identification number may also be referred to as an identification code. The identification code may include as many alphanumeric characters or as many symbols as the correctional facility or the commissary chooses. In yet another exemplary embodiment, the first time the inmate uses the system, the inmate enters the identification code he desires. The inmate is given certain criteria for the identification code, for example, that the code include at least eight characters, at least one of which is a number, and that the code cannot be the same as any codes previously submitted by other inmates.

Once the pertinent identification number is entered by the user at step 212, the system optionally checks to see if a password is required. A password may be supplied by the commissary facility, the correctional facility, or may be chosen by the user as an additional layer of security and identity verification for users of the system. In an exemplary embodiment, the password includes a numeric sequence having a specified number of digits. In other exemplary embodiments, the password may include alphanumeric characters and symbols. If a password is required, the system prompts the inmate to enter the password.

In another exemplary embodiment, other forms of inmate recognition or identification are utilized to verify that a specific inmate is accessing the system. Instead of entering an identification code and password, a biometric sensor may be used to procure an inmate's fingerprint. The fingerprint obtained is compared to a collection of fingerprints previously obtained and matched to specific inmates, so that the system can identify which inmate's fingerprint was just obtained. In another exemplary embodiment, voice recognition software is utilized to identify a specific inmate and provide that identification to the system. Other methods of user identification are known in the art and may be used by the system 150.

After the inmate enters the password at step 212, the system compares the entered identification number and password to identification numbers and passwords stored on the system for authorized users. If the identification number does not correspond to identification data stored on the system, the system indicates a bad identification number. The system prompts the user that the entered identification number is not correct and to re-enter an identification number. The system may store identification data in various ways, including but not limited to, storing a password in clear text, storing a reversible encrypted equivalent of a password, and storing a non-reversible calculation based on a combination of values including the password.

If at step 212 the entered password does not match a password stored on the system for the associated identification number entered by the user, a bad password is indicated and the system prompts the user that the entered password is not correct and to re-enter a password.

If at step 212 a password is not required to access the system, the system compares the entered identification number to identification numbers stored on the system for authorized users.

If at step 212 the entered identification number matches an identification number for an authorized user that is stored on the system, or alternatively if the entered identification number and password are found on the system, the system presents a main menu at step 214.

Step 214 includes providing a user with multiple process options, wherein the user is prompted to select which process the system will perform next. The process options may include, but are not limited to, presenting 216 a transaction history, providing 218 commissary selections, providing 220 appointment options, and presenting 222 facility information.

At steps 224, 226, and 228, the system provides navigational options to a user. The navigational options allow a user to move through the privilege administration processes 200 by choosing an option provided by the system. The navigational options may include, but are not limited to, present main menu, which returns a user to step 214, and initiate log out 230.

If log out 230 is selected, the user is returned to step 208. Also, identification data and passwords entered by the user at step 212 may be deleted from the system, to prevent subsequent users from using the system without supplying a proper identification number and password.

Figure 4:
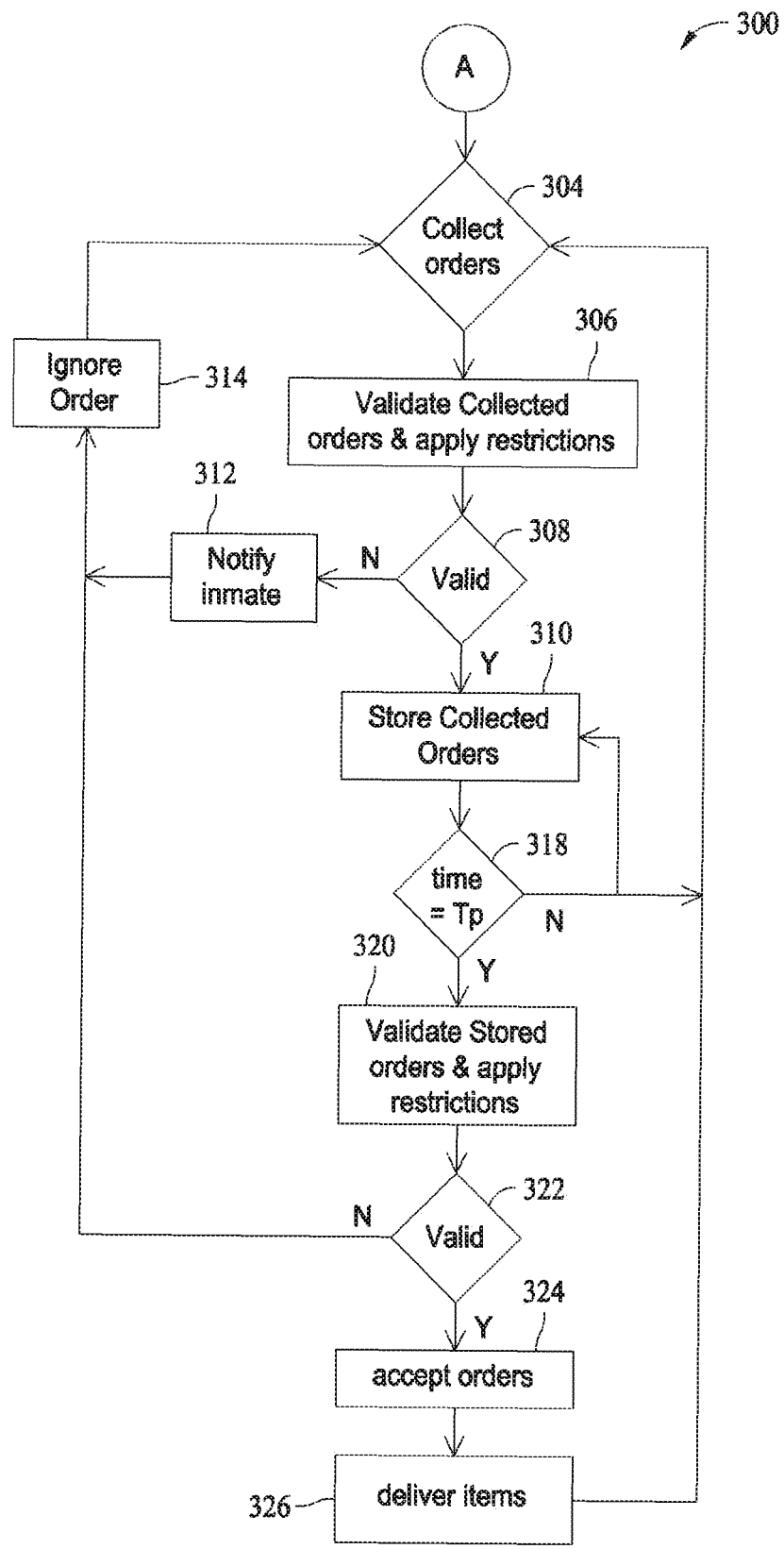
FIG. 4 is a method flowchart of order collection processes executed by the system shown in FIG. 1.

FIG. 4 is a method flowchart of order collection processes 300 executed by the system shown in FIGS. 1 and 2. Order collection processes 300 include collecting orders from inmates for commissary items at step 304. As orders are submitted and collected, they are validated for compliance with applicable correctional facility restrictions at steps 306 and 308. More specifically, the system compares a submitted order to item and quantity restrictions in place for the inmate making the order. If a submitted order does not violate item or quantity restrictions, the order is determined to be valid, and the system stores the submitted order at step 310. Optionally, the system may also check for a spending account balance sufficient to pay for the ordered items before the system stores the submitted order at step 310. A valid submitted order is deemed to be a pending order, which may also be referred to as an order request, for the purposes of the system, and the order purchase total is reserved from the inmate's spending account pending final approval of the order as explained below.

If at step 308 a submitted order violates item or quantity restrictions of the correctional facility, it is determined to be an invalid order. For invalid orders, the system notifies the inmate 312 that the order is invalid, perhaps with information regarding the actual restriction that was violated. Additionally, an invalid order is rejected and ignored by the system at step 314 and the system returns to collect another order at step 304. That is, the system does not undertake further processing of invalid orders once they are determined to be invalid. The system may, however, log invalid order requests for analysis purposes as an indicator of system performance or as a monitoring tool for inmate activity on the system.

In an exemplary embodiment, valid orders are stored and accumulated as pending but unapproved orders at step 310 until a predetermined time when all the pending orders are processed as a batch or group for final approval and distribution by the commissary service. The predetermined time may be selected by the correctional facility, and may be for example, a recurring day and time on a weekly basis. For example, orders may be collected over the course of a week before being processed by the commissary service for delivery. Cost savings may be realized by processing pending orders as a batch and shipping, handling, or distributing accepted orders in a group. Optionally, either in combination with, or in place of a recurring day and time for distribution by the commissary service, a facility may initiate processing of a batch of orders for final approval and distribution by the commissary service. Accordingly, at step 318, the system compares a current time to the designated or predetermined time for processing orders $T_p$. If the current time is not equal to $T_p$, the system continues to store the pending orders at step 310 and continues to collect orders at step 304.

If at step 318 the current time is equal to the predetermined time for processing orders $T_p$, the system proceeds to validate the pending orders at steps 320 and 322. That is, the system proceeds to validate orders at the time $T_p$ even though they were previously validated at steps 306 and 308 at the time of submission by the inmate. Validation at time $T_p$ provides an opportunity to once again review the order at a subsequent point in time to when the order was submitted to see if restrictions in place at time $T_p$ prevent fulfillment of the order at time $T_p$. Alternatively stated, changes or adjustments in restrictions between a time of submission $T_s$ of an order and a time of processing $T_p$ of the order for acceptance will be reflected in the validation at time $T_p$ but not at time $T_s$. Thus, the system will, due to applicable correctional facility restrictions placed upon an inmate in the interval of time between $T_s$ and $T_p$, prevent an inmate from ordering an item that would violate a restriction, sometimes referred to as a restricted item, both at the time of order submission and at a later point in time prior to approval and delivery of the item by the commissary. Such two-step validation of orders, unlike existing commissary systems for correctional facilities, accounts for changes in applicable restrictions between order submissions and item delivery, and ensures that inmates may not receive items that did not violate restrictions at the time of submission, $T_s$, but that violate restrictions at the time of processing, $T_p$.

If at step 322 a pending order violates item or quantity restrictions of the correctional facility at the time $T_p$, it is determined to be an invalid order and the purchase price of the restricted item or items is credited back to the inmate from the reserve made when the order was submitted. An invalid order is rejected and ignored by the system at step 314 and the system does not undertake further processing of the invalid order. The system may, however, log invalid pending order requests for analysis purposes as an indicator of system performance or as a monitoring tool for inmate activity on the system.

If at step 322, pending orders are determined to comply with applicable restrictions, and assuming that the inmate has a sufficient spending account balance for the ordered items, the order is valid and is accepted by the system at step 324 for final processing and delivery to inmates at step 326. Approved orders are appropriately debited from inmate spending accounts once the orders are approved.

At steps 320 and 322, it may occur that an order containing several items or more may be found to be partly valid for some of the items and partly invalid for other of the items. In such a situation, the system may approve the order to the extent that it is valid and indicate to the inmate, for example on an inmate receipt, the reason the invalid portion of the order was restricted.

Figure 5:
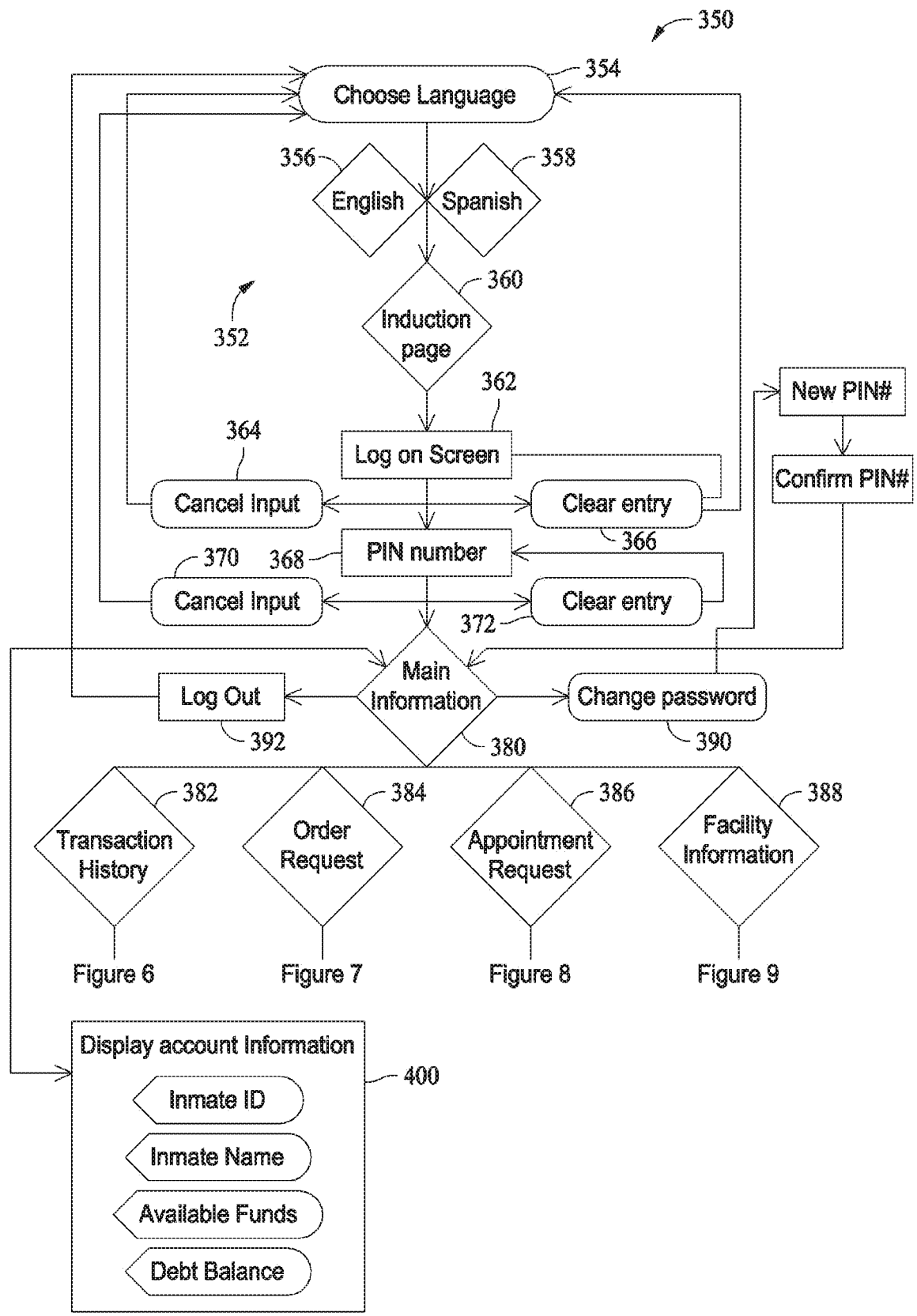
FIG. 5 illustrates an exemplary algorithm utilized by the system shown in FIGS. 1 and 2 to administer inmate privileges.

FIG. 5 illustrates an exemplary privilege administration algorithm 350 that may be utilized to perform privilege administration processes 200 using the system shown in FIGS. 1 and 2. In the exemplary embodiment of FIG. 5, an inmate is guided through the privilege administration processes 200 by a touch screen display. The inmate is also provided with the ability to input selections into the system by touching areas of the display that are indicated to correspond to a selection in order to accomplish the privilege administration processes 200 the inmate desires. It is contemplated, however, that the system could alternatively respond to other feedback inputs and signals from an inmate, including but not limited to, commands input using a keyboard, commands input using a computer mouse, commands input using labeled buttons, and voice commands from the inmate. The algorithm shown in FIG. 5, and in more detail in FIGS. 6-9, is therefore provided solely for purposes of illustration rather than limitation, and it is understood that the system and processes shown in FIGS. 1-4 could be implemented with other algorithms and scripts while achieving similar advantages and benefits.

As shown in FIG. 5, privilege administration algorithm 350 includes an authentication algorithm 352. The authentication algorithm 352 includes prompting a user to choose a language 354, such as exemplary languages English 356 and Spanish 358. After a language is selected, an induction page is presented 360 to the user. The induction page may include preliminary remarks such as a welcome message, instructions on how to use the system, information on system capabilities, and explanations of optional process that may be accomplished using the system.

The authentication algorithm 352 also includes prompting a user to log on 362 to the system. Identification numbers and passwords are described above in reference to FIG. 3. Authentication algorithm 352 provides an inmate with an identification number entry step 362. Identification number entry step 362 may include presenting a display on a touch screen device that provides numbers and/or letters that may be pressed to input an identification number. In certain exemplary embodiments, a selection is provided to indicate to the system that the user is finished entering the identification number, for example, an Enter selection.

Identification number entry step 362 also includes presenting navigational options to a user, including but not limited to, a cancel input option 364, and a clear entry option 366. If an inmate selects the cancel input option 364, the system prompts the inmate to choose a language 354. If an inmate selects the clear entry option 366, the inmate is prompted to log on 362, and the inmate is allowed to enter an identification number from the beginning.

The authentication algorithm 352, in certain embodiments, also includes prompting a user to enter a password 368 into the system. Providing a password entry step 368 may include presenting a display on a touch screen device that provides numbers and/or letters that may be pressed to input a password. In certain exemplary embodiments, a selection is provided to indicate to the system that the user is finished entering the password, for example, an Enter selection.

Password entry step 368 also includes presenting navigational options to a user, including but not limited to, a cancel input option 370, and a clear entry option 372. If an inmate selects the cancel input option 370, the system prompts the inmate to choose a language 354. If an inmate selects the clear entry option 372, the inmate is returned to password entry step 368, and is able to enter a password from the beginning.

As described above with regard to privilege administration processes 200, once a recognized identification number and/or a recognized identification number and password combination is entered into the system, the privilege administration algorithm 350 includes presenting 380 a main menu to the inmate.

Algorithm step 380 includes presenting a plurality of algorithms to an inmate, from which the inmate may select the next algorithm the system will run. The plurality of algorithms may include, but are not limited to, presenting 382 a transaction history, providing 384 commissary selections, providing 386 appointment options, and presenting 388 facility information.

Presenting 380 a main menu includes providing navigational options to a user. The navigational options allow a user to move through the privilege administration algorithm 350 by choosing an option provided by the system. The navigational options may include, but are not limited to, change password 390, and initiate log out 392.

If an inmate selects step 390, algorithm 350 prompts a user to enter a new password 394 and confirm the new password 396. The new password is then saved by the system, such that the new password corresponds to the inmate's identification number. Once the confirmed password is accepted by the system, algorithm 350 returns to step 380.

If log out 392 is selected, the user is returned to step 354. Also, identification data and passwords entered by the user may be deleted from the system, to prevent subsequent users from using the system without supplying a proper identification number and password.

Presenting 380 a main menu to the inmate also includes presenting account information 400 to the inmate. The account information displayed may include, but is not limited to, an inmate ID, an inmate name, available funds, and a debt balance.

FIGS. 6-9 illustrate expanded diagrams of algorithms 382, 384, 386, and 388 of FIG. 5 that may be utilized by the privilege administration system 150 shown in FIGS. 1 and 2 to perform processes 216, 218, 220, and 222 of FIG. 3.

Figure 6:
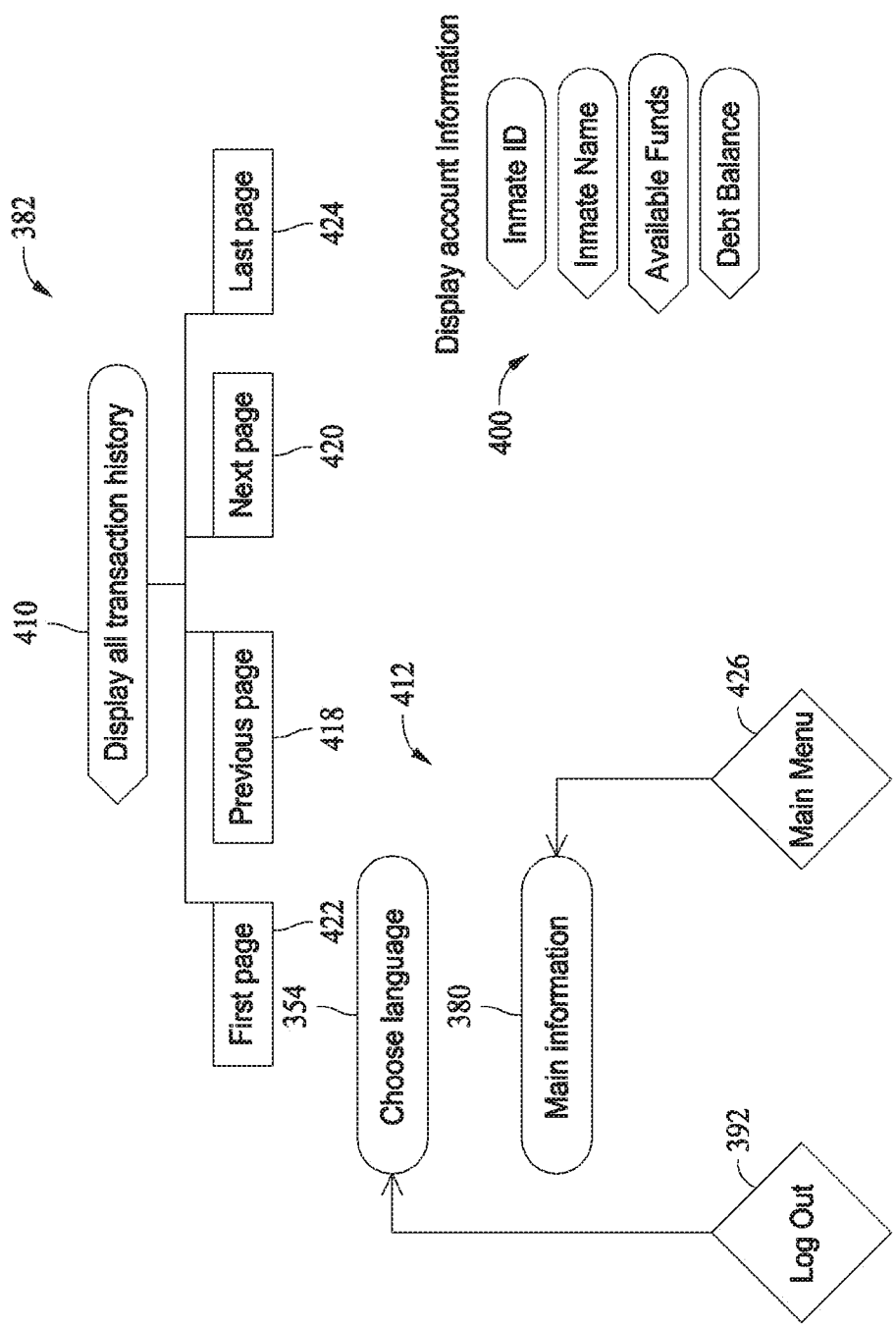

FIG. 6 illustrates transaction history algorithm 382 that may be utilized by the privilege administration system 150 shown in FIGS. 1 and 2 to perform process 216 of FIG. 3. Transaction history algorithm 382 includes presenting transaction history 410, providing navigational options 412, and presenting account information 400.

Presenting transaction history 410 may include, but is not limited to, presenting a transaction description, a transaction type, the date each transaction either occurred or was recorded, a transaction amount, and a spending account balance after accounting for each transaction. Transactions included in the detailed transaction history may include, deposits into an inmate's spending account and deductions from an inmate's spending account including, but not limited to, deductions to pay for vandalism, deductions to pay for commissary purchases, deductions to pay for medical services, and deductions to pay for telephone calls. Transaction types may include, but are not limited to, vandalism, purchases, cash deposits, and medical.

In an exemplary embodiment, the transaction history is displayed on a screen in a table format. The table may have columns corresponding to the details of each transaction presented, and rows corresponding to each transaction presented. In an exemplary embodiment, the table includes a column for transaction date, a column for the type of transaction, a column for a description of a transaction, a column for a transaction amount, and a column for an account balance. The number of columns and rows that may be presented is dependent upon the size of the display screen and the size of the columns and rows. In one embodiment, scroll bars may be used to either move the table up or down to view rows not previously displayed on the display screen. Also, a scroll bar may be used to either move the table to the left or to the right to view columns not previously displayed on the display screen.

In another embodiment, a first page of rows and columns is displayed on the display screen. Algorithm 382 provides page selection entries including, but not limited to, view a previous page 418, view a next page 420, view a first page 422, and view a last page 424. The page selection entries allow an inmate to view all of the transactions provided to the system 150.

Providing navigational options 412 allows an inmate to move through the privilege administration algorithm 350 by choosing an option provided by the system. The navigational options may include, but are not limited to, present main menu 426, which returns an inmate to step 380, and initiate log out 392, which returns an inmate to step 354.

As described with regard to FIG. 5, presenting account information 400 to the inmate may include, but is not limited to, presenting an inmate ID, an inmate name, available funds, and a debt balance.

Figure 7:
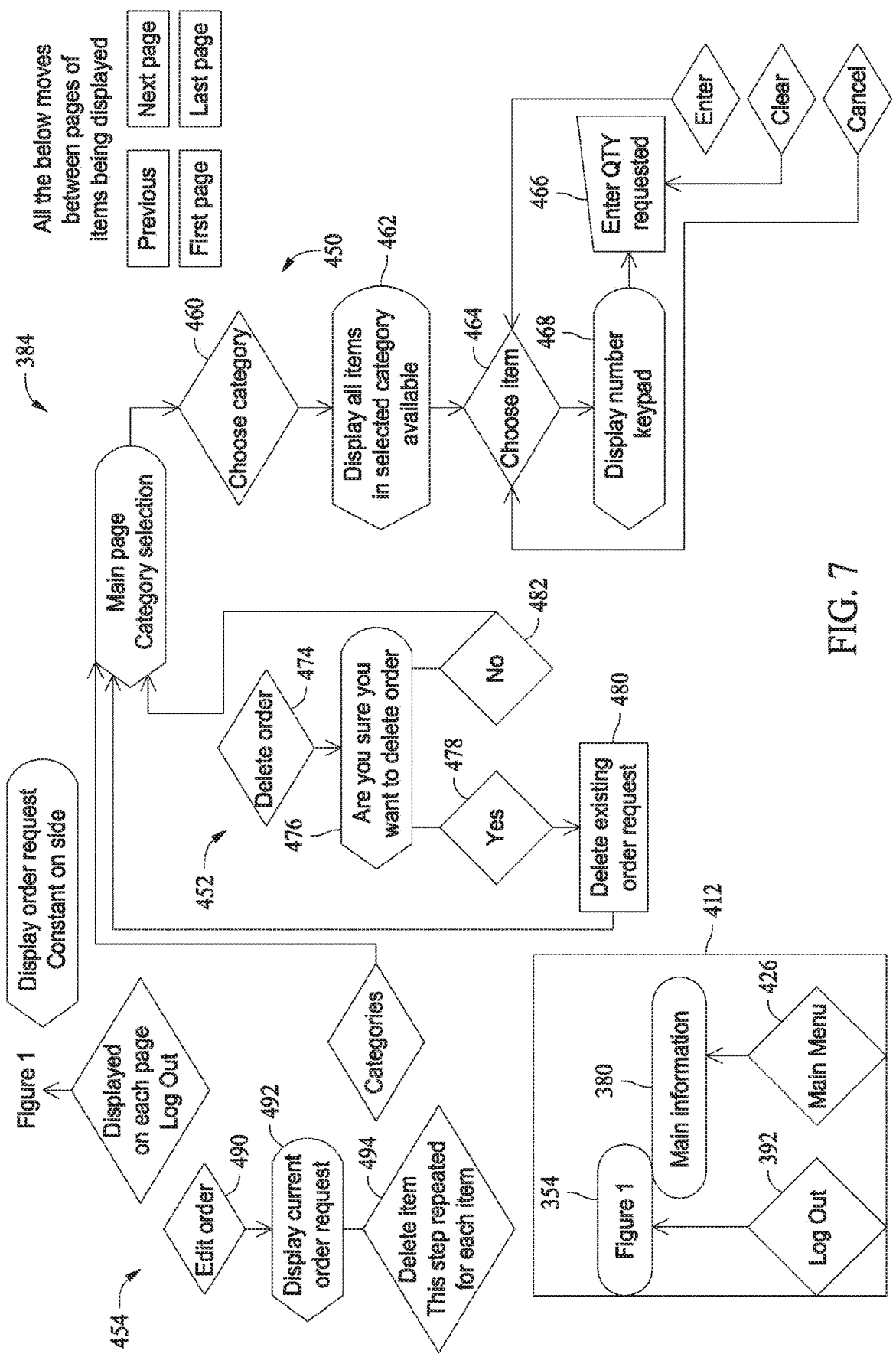

FIG. 7 illustrates a commissary order processing algorithm 384 that may be utilized by the privilege administration system 150 shown in FIGS. 1 and 2 to perform process 218 of FIG. 3. Commissary order processing algorithm 384 includes providing a commissary order selection algorithm 450, a commissary order deletion algorithm 452, a commissary order editing algorithm 454, and navigational options 412.

Providing a commissary order selection algorithm 450 includes presenting 460 a plurality of commissary categories to an inmate. Commissary items are separated into commissary categories for organizational purposes. These categories may include, but are not limited to, soups/rice, drinks/mixes, chips/pretzels, cookies/crackers, pastries, meats/seafood, candy, condiments/spreads, hygiene, electronics, clothing, and miscellaneous.

Providing a commissary order selection algorithm 450 further includes presenting 462 all items in a category selected by an inmate at step 460. In an exemplary embodiment, the items are displayed on a screen in a table format. The table may have columns corresponding to the details of each item presented, and rows corresponding to each item presented. In an exemplary embodiment, the table includes a column for an item number, a column for an item description, a column for an item price, a column indicating a tax percentage, and a column containing a picture, illustration, or graphical icon corresponding to the item. The number of columns and rows that may be presented is dependent upon the size of the display screen and the size of the columns and rows. In one embodiment, scroll bars may be used to either move the table up or down to view rows not previously displayed on the display screen. Also, a scroll bar may be used to either move the table to the left or to the right to view columns not previously displayed on the display screen.

In another embodiment, a first page of rows and columns is displayed on the display screen. Algorithm 384 includes providing page selection entries including, but not limited to, view a previous page, view a next page, view a first page, and view a last page. The page selection entries allow an inmate to view all of the items included in the selected category.

Providing a commissary order selection algorithm 450 also includes allowing an inmate to select 464 an item and enter 466 a quantity of that item that is being requested. In an exemplary embodiment, once an item is selected, a number keypad is provided 468 on a touch screen display. An inmate may then enter the desired quantity of the item. Once the quantity is accepted by the system 150, the inmate is notified of the acceptance, and is allowed to select another item at step 464.

Commissary order deletion algorithm 452 includes providing an inmate with an option to delete 474 an existing order. Order deletion algorithm 452 may also include providing 476 a warning, which asks an inmate to verify the deletion. If the deletion is verified 478, the existing order is deleted 480 and algorithm 452 again provides the inmate with a selection of commissary categories. If the deletion is not verified 482, algorithm 452 also returns to the commissary category selections, but without deleting the current order.

Commissary order editing algorithm 454 includes providing an inmate with an option to edit 490 an existing order. Order editing algorithm 454 also includes presenting 492 the items in the current order request to an inmate and allowing the inmate to edit or delete 494 the items in the order.

Presenting navigational options 412 allows an inmate to move through the privilege administration algorithm 350 by selecting an option provided by the system. The navigational options may include, but are not limited to, present main menu 426, which returns an inmate to step 380, and initiate log out 392, which returns an inmate to step 354.

Figure 8:
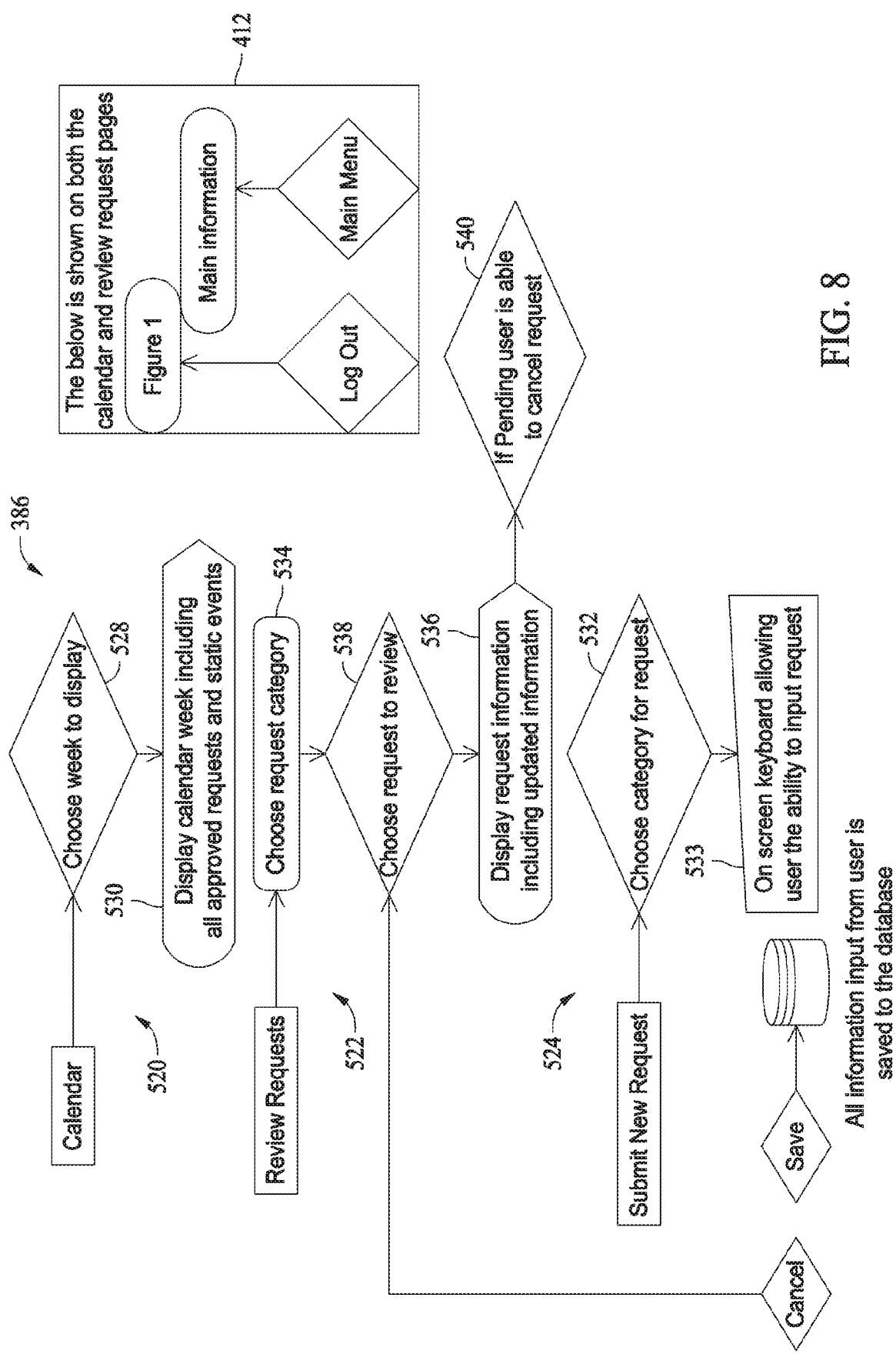

FIG. 8 illustrates an appointment processing algorithm 386 that may be utilized by the privilege administration system 150 shown in FIGS. 1 and 2 to perform process 220 of FIG. 3. Appointment processing algorithm 386 includes providing a calendar view 520, a privilege request review algorithm 522, a new privilege request algorithm 524, and navigational options 412.

In one embodiment, providing a calendar view 520 includes selecting 528 a week to present to an inmate and presenting 530 approved appointments and events that occur during that week. Once the week is displayed, an inmate may select other days to view by, for example, scrolling to days not previously displayed or selecting a new page to view containing a different week. Calendar view 520 may be organized in rows and columns, with each column representing one day and rows representing the hours within that day. An appointment displayed in a specific column and row pairing indicates that the inmate has an appointment on the day corresponding to the column and at the time corresponding to the row. Inmate appointments may include, but are not limited to, meals, exercise periods, educational classes, therapy sessions, and religious services.

In another embodiment, providing a calendar view 520 may include presenting the dates and times of an inmate's scheduled appointments for a one month period, or any other period of time desired.

Using the new privilege request algorithm 524, an inmate is able to request an appointment to take advantage of an inmate privilege. The new privilege request algorithm 524 includes providing 532 an inmate with a list of categories and a way of inputting 533 a specific request. Appointment categories may include, but are not limited to, hygiene, legal research, and visitation. Examples of specific requested appointments are getting a haircut, using the library for legal research, and using video visitation.

The privilege request review algorithm 522 provides an inmate with a list of previously submitted appointment requests. In an exemplary embodiment, the requests are displayed on a screen in a table format. The table may have columns corresponding to the details of each request presented, and rows corresponding to each request presented. In an exemplary embodiment, the table includes a column for the category of request, the status of the request, the date and time the request was submitted, and a column for comments. The number of columns and rows that may be presented is dependent upon the size of the display screen and the size of the columns and rows. In one embodiment, scroll bars may be used to either move the table up or down to view rows not previously displayed on the display screen. Also, a scroll bar may be used to either move the table to the left or to the right to view columns not previously displayed on the display screen. Also, a menu may be provided 534 allowing an inmate to selectively view recently added requests, pending requests, approved requests, or cancelled requests.

The privilege request review algorithm 522 includes providing 536 a specific request after an inmate selects 538 that request. The inmate is able to view the request and also to cancel 540 the request if the request is pending.

Presenting navigational options 412 allows an inmate to move through the privilege administration algorithm 350 by selecting an option provided by the system. The navigational options may include, but are not limited to, present main menu 426, which returns an inmate to step 380, and initiate log out 392, which returns an inmate to step 354.

Figure 9:
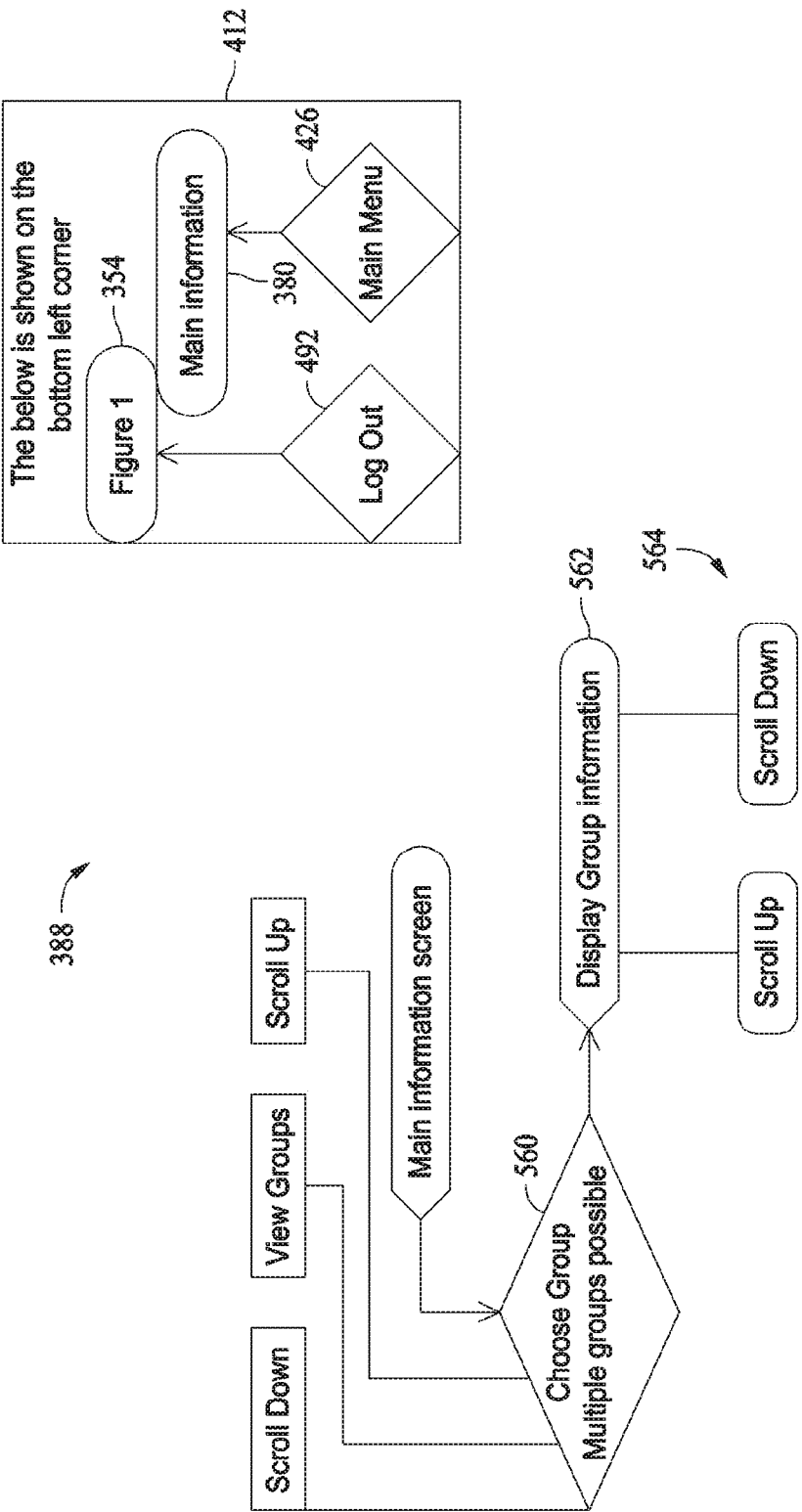

FIG. 9 illustrates a facility information presenting algorithm 388 that may be utilized by the privilege administration system 150 shown in FIGS. 1 and 2 to perform process 222 of FIG. 3. Facility information presenting algorithm 388 presents 560 a list of groups to an inmate. The groups are used to organize the facility information. The groups may include, but are not limited to, information regarding legal research, and information regarding video visitation. In an exemplary embodiment, once a group is selected by an inmate, the system displays 562 the group information and provides 564 scrolling and/or page selection inputs to a user, enabling the inmate to view more information than can be displayed on a single screen.

Facility information presenting algorithm 388 also includes presenting navigational options 412. Presenting navigational options 412 allows an inmate to move through the privilege administration algorithm 350 by choosing an option provided by the system. The navigational options may include, but are not limited to, present main menu 426, which returns an inmate to step 380, and initiate log out 392, which returns an inmate to step 354.

IV. Exemplary User Interfaces of the Invention

Having now described exemplary processes utilized by the invention, the methods and processes described above may be implemented using a menu-driven graphical interface described in the examples below that guide the user through privilege administration options.

FIGS. 10-26 illustrate exemplary displays of a user interface for the system 150 in an exemplary embodiment. The examples of FIGS. 10-26 are illustrative only, and it is contemplated that other interfaces and displays may likewise be utilized in different embodiments of the invention without limitation.

Figure 10:
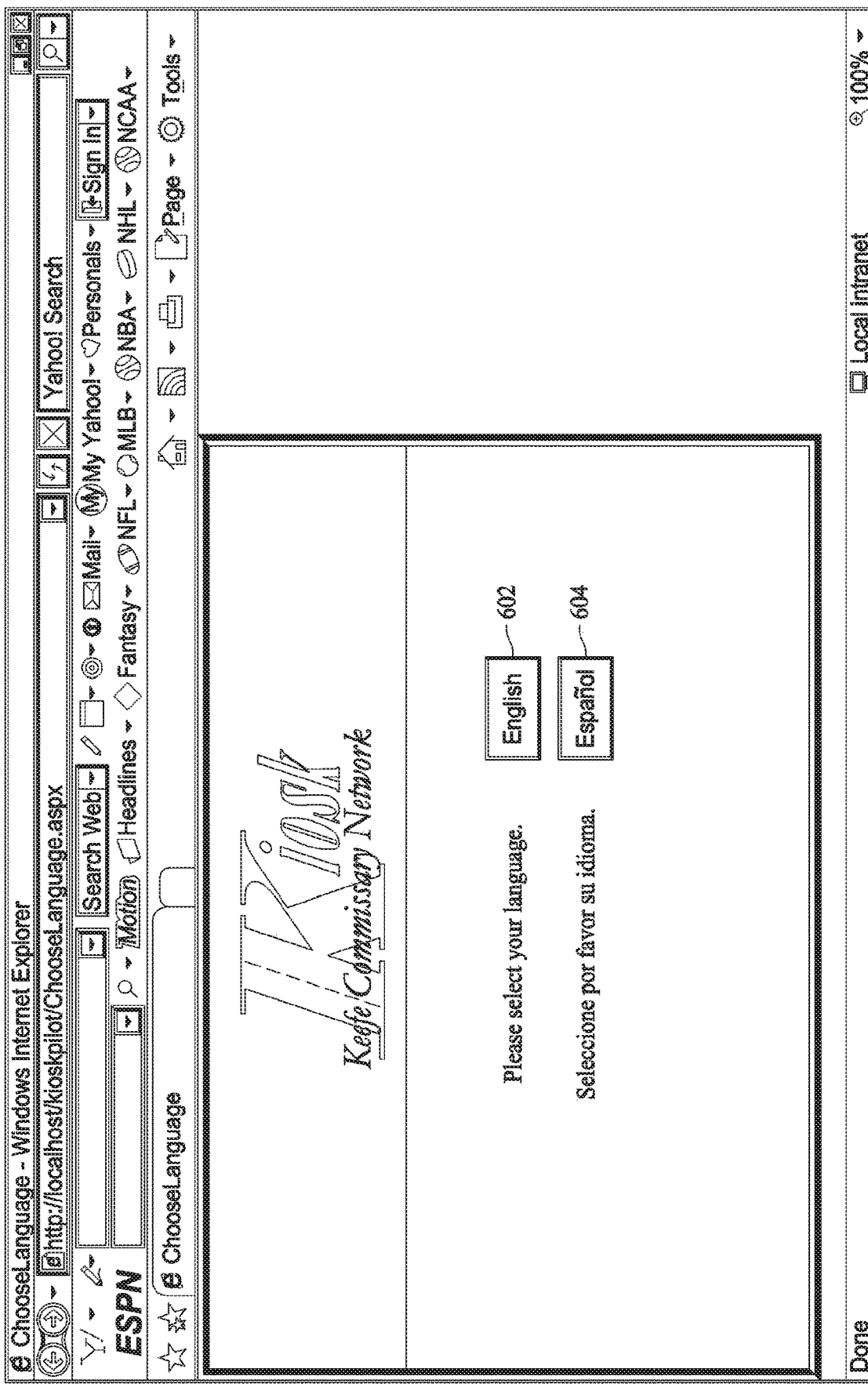

FIG. 10 is an example embodiment of a user interface displaying a language selection screen 600 for a user of the system. The language selection screen 600 includes a plurality of buttons 602, 604 that provide an inmate with optional languages that information and options may be presented in. An inmate may select the language that the system will present information and options by selecting one of the plurality of buttons 602, 604.

Figure 11:
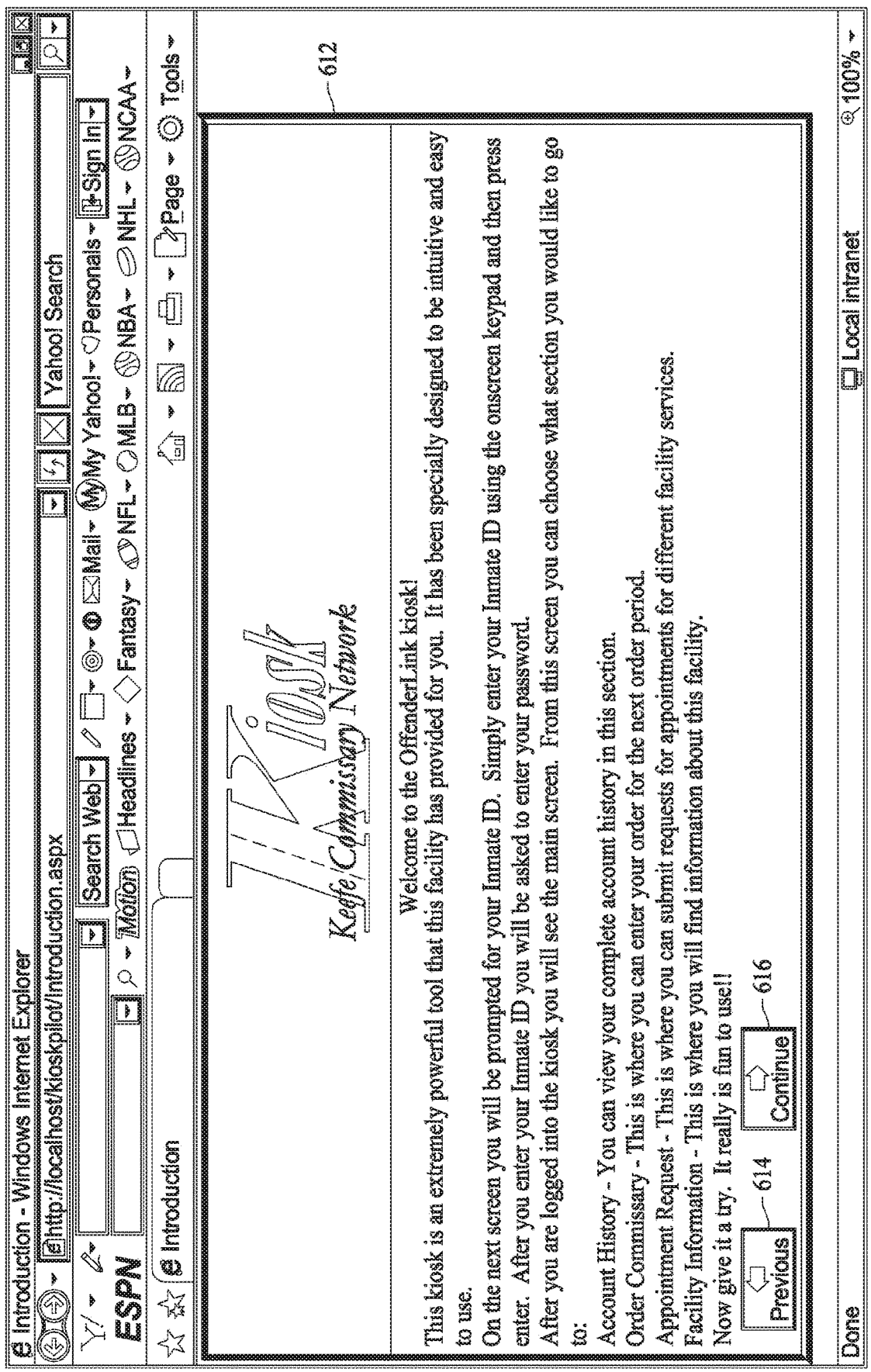

FIG. 11 is an example embodiment of a user interface displaying an instruction screen 610 for a user of the system. The instruction screen 610 includes an instruction section 612, a previous button 614, and a next button 616. Information and instructions for the inmate are provided within the instruction section 612. The previous button 614, when selected, returns the inmate to the language selection screen 600. The next button 616 is provided to allow the inmate to proceed to a subsequent screen.

Figure 12:
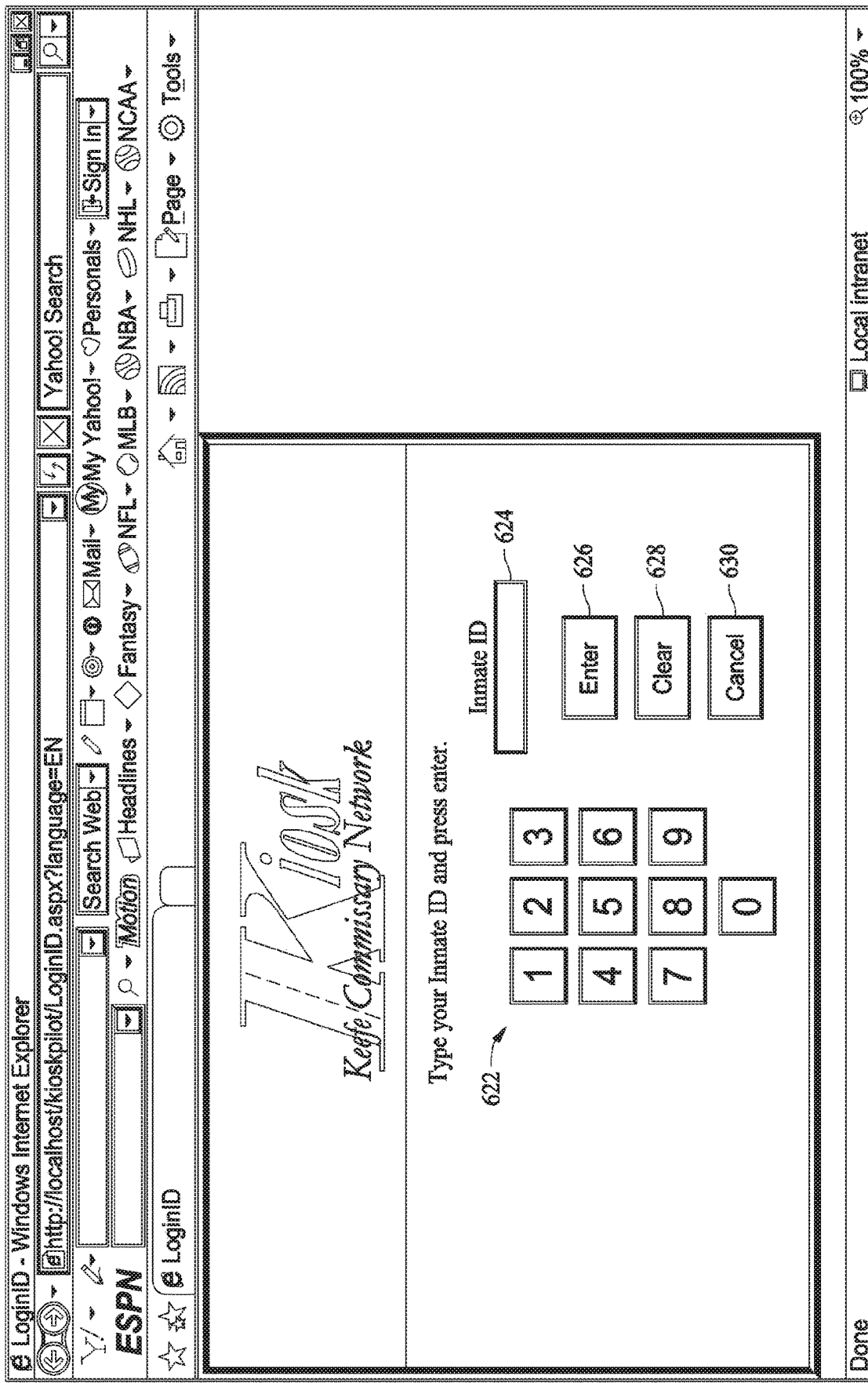

FIG. 12 is an example embodiment of a user interface displaying an identification entry screen 620 for a user of the system. Authorized system users may log onto the system 150 by entering an identification number. In the exemplary embodiment of FIG. 12, the number is entered into the system by selecting from the provided numbers 622. Each entered number, or an indication that a number was entered, appears in inmate ID box 624. An enter button 626 is also provided. The enter button 626 indicates to the system that the user has completed entry of the identification number. A clear button 628, when selected, clears the inmate ID box 624 and provides the user with an opportunity to re-start entering an identification number, for example, after a user realizes a wrong number has been entered. A cancel button 630 is provided to return a user to the language selection screen 600 should the user no longer want to log on to the system.

Figure 13:
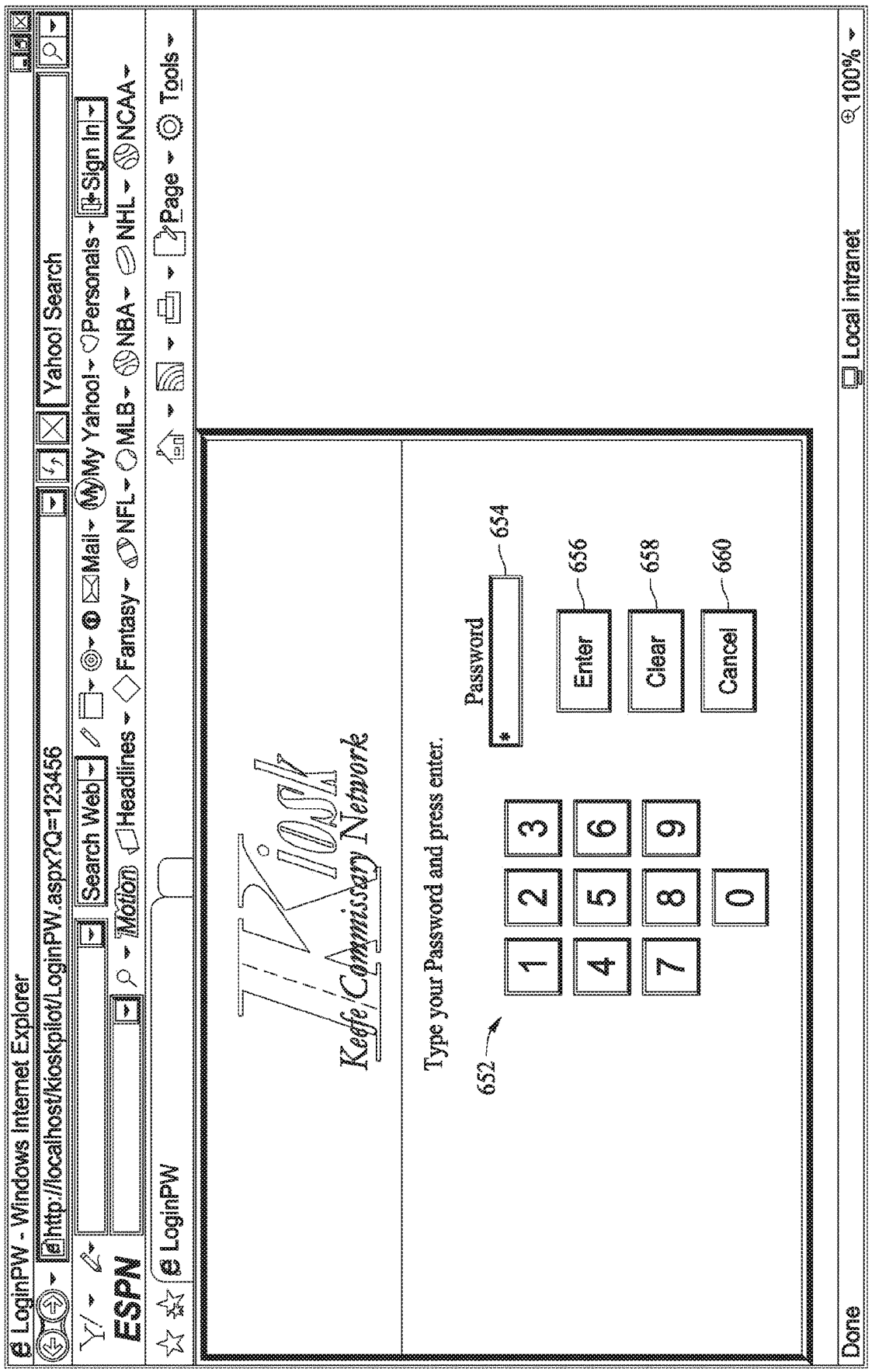

FIG. 13 is an example embodiment of a user interface displaying a password entry screen 650 for a user of the system. In certain embodiments, in addition to the identification number, a password must also be entered. As described in regard to the identification number, the password is entered into the system by selecting from the provided numbers 652. Each entered number, or an indication that a number was entered, appears in password box 654. In an exemplary embodiment, an indication that a number was entered may include presenting an asterisk or a dot within password box 654 after each number is entered by a user. By presenting an asterisk or a dot within password box 654, the user is made aware that a number was entered. However, by not presenting the actual number that was entered in the password box 654, other people near the user, people who might use the user's password in dishonest or fraudulent ways, are not able to see the password within password box 654.

An enter button 656 is also provided. The enter button 656 indicates to the system that the inmate has completed entry of the password. A clear button 658, when selected, clears the password box 654 and provides the inmate with an opportunity to re-start entering a password, for example, after an inmate realizes a wrong number has been entered. A cancel button 660 is provided to return a user to the language selection screen 600 should the user no longer want to log on to the system. If the submitted identification number and password match an identification number and password pairing stored by the system, a user will be authorized to log onto the system 150.

Figure 14:
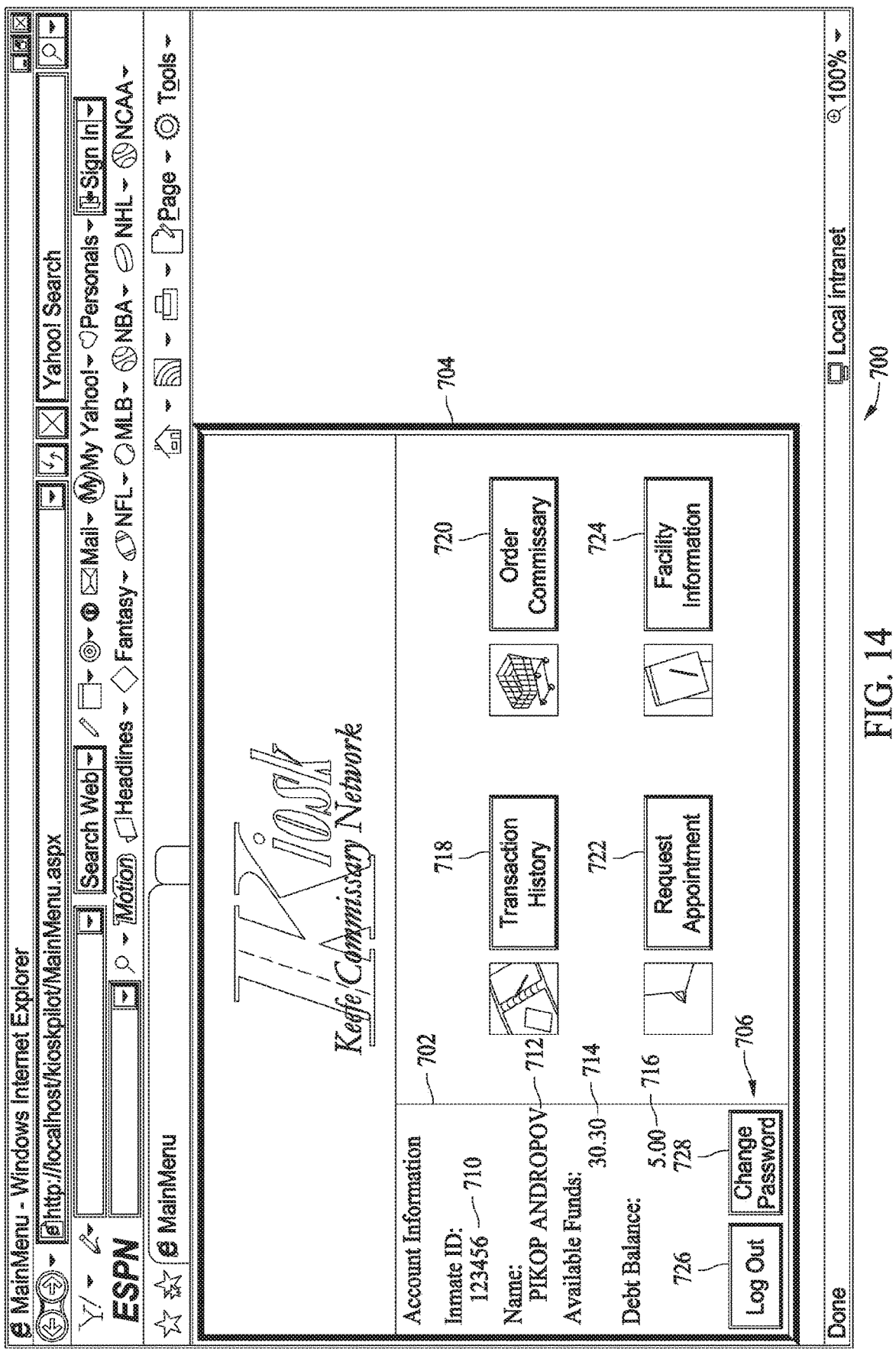

FIG. 14 is an example embodiment of a user interface displaying a main menu screen 700 for a user of the system. The main menu screen 700 includes an account information section 702, a menu selection section 704, and navigational buttons 706.

The account information section 702 may include, but is not limited to, such account information as an inmate identification number 710, an inmate name 712, an amount of available funds 714, and a debt balance 716.

The menu selection section 704 may include, but is not limited to, buttons representing menu selections such as transaction history 718, commissary 720, appointment request 722, and facility information 724.

When a user selects the transaction history button 718, algorithm 382 of FIG. 6 is executed to display the user's transaction history. When a user selects the commissary button 720, algorithm 384 of FIG. 7 is executed to select items, edit, and delete orders. When a user selects the appointment request button 722, algorithm 386 is executed to display, review, and submit requests for appointments. When a user selects the facility information button 724, algorithm 388 is executed to display facility information.

Navigational buttons 706 may include, but are not limited to, a logout button 726 and a change password button 728. The logout button 726 returns the system to the language selection screen 600. If a user selects the change password button 728, in one embodiment, the system calls step 390 of FIG. 5 for entry and confirmation of a new password.

Figure 15:
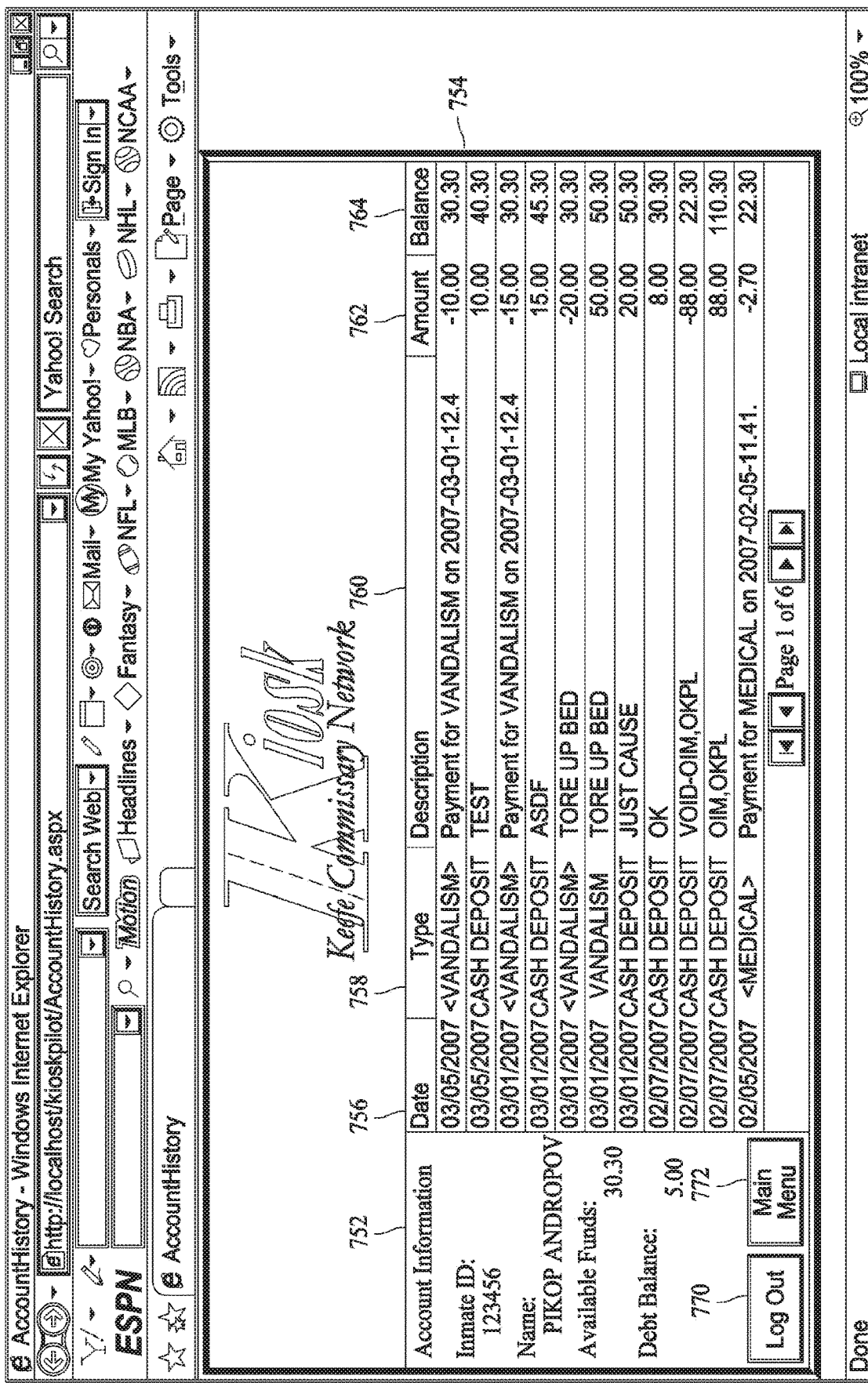

FIG. 15 is an example embodiment of a user interface displaying a transaction history screen 750 for a user of the system. After a user selects the transaction history button 718 on the main menu screen 700 of FIG. 14, algorithm 382 of FIG. 6 is executed and transaction history screen 750 is presented. The transaction history screen 750 includes an account information section 752, a transaction history section 754, and navigational buttons.

As described above with respect to main menu screen 700, the account information section 752 may include, but is not limited to, such account information as an inmate identification number 710, an inmate name 712, an amount of available funds 714, and a debt balance 716.

The transaction history presented in transaction history section 754 may include, but is not limited to, a transaction description, a transaction type, the date each transaction either took place or was recorded, a transaction amount, and a spending account balance after each transaction is accounted for. Transactions included in the detailed transaction history may include, deposits into an inmate's spending account and deductions from an inmate's spending account including, but not limited to, deductions to pay for vandalism, deductions to pay for commissary purchases, deductions to pay for medical services, and deductions to pay for telephone calls. Transaction types may include, but are not limited to, vandalism, purchases, cash deposits, and medical.

As shown in FIG. 15, the transaction history section 754 may be organized in a table format, with rows corresponding to each transaction presented and columns corresponding to the details of each transaction presented. Transaction history section 754 includes a column for transaction dates 756, a column for a description of the type of transaction 758, a column for a description of the transaction 760, a column for a transaction amount 762, and a column for an account balance 764.

Navigational buttons, such as a log out button 770 and a main menu button 772, allow an inmate to move through the privilege administration algorithm 350. The log out button 770 returns a user to the language selection screen 600 and the main menu button 772 returns a user to the main menu screen 700.

Figure 16:
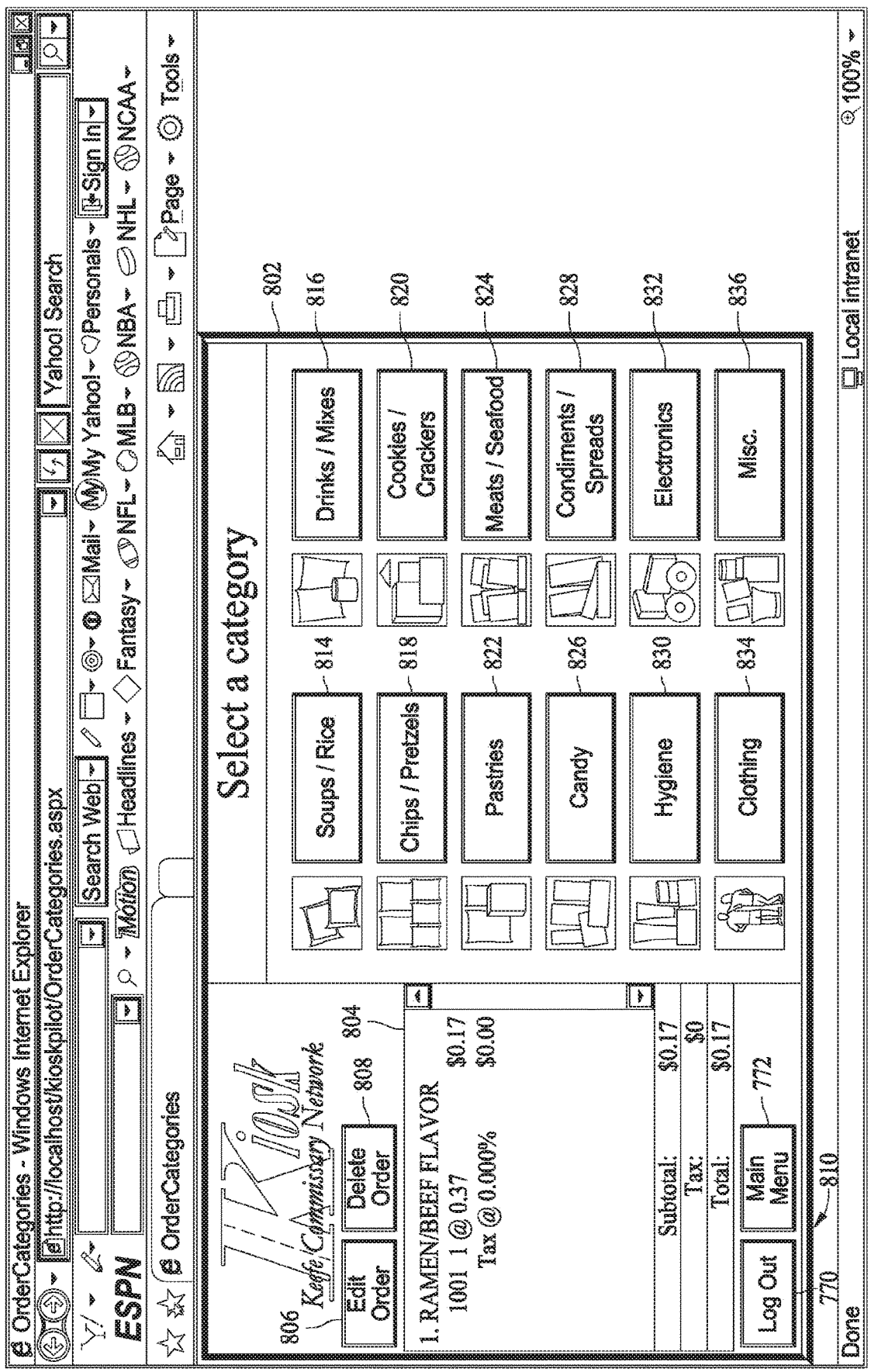

FIG. 16 is an example embodiment of a user interface displaying a category selection screen 800 for a user of the system. Category selection screen 800 includes a category section 802, a current order list 804, an edit order button 806, a delete order button 808, and navigational buttons 810.

Category section 802 includes a plurality of buttons corresponding to various commissary product categories. FIG. 16 illustrates buttons corresponding to categories of commissary products including, soups/rice 814, drinks/mixes 816, chips/pretzels 818, cookies/crackers 820, pastries 822, meats/seafood 824, candy 826, condiments/spreads 828, hygiene 830, electronics 832, clothing 834, and miscellaneous 836. Once a user selects a category, the user is presented with items predetermined to belong within the category.

The current order list 804 includes a list of items currently selected by the inmate to be ordered. When a user selects the edit order button 806, algorithm 454 of FIG. 7 is executed to provide an inmate with order editing options. When a user selects the delete order button 808, algorithm 452 of FIG. 7 is executed to provide an inmate with order deletion options.

Navigational buttons 810, such as a log out button 770 and a main menu button 772, allow an inmate to move through the privilege administration algorithm 350. The log out button 770 returns a user to the language selection screen 600 and the main menu button 772 returns a user to the main menu screen 700.

Figure 17:
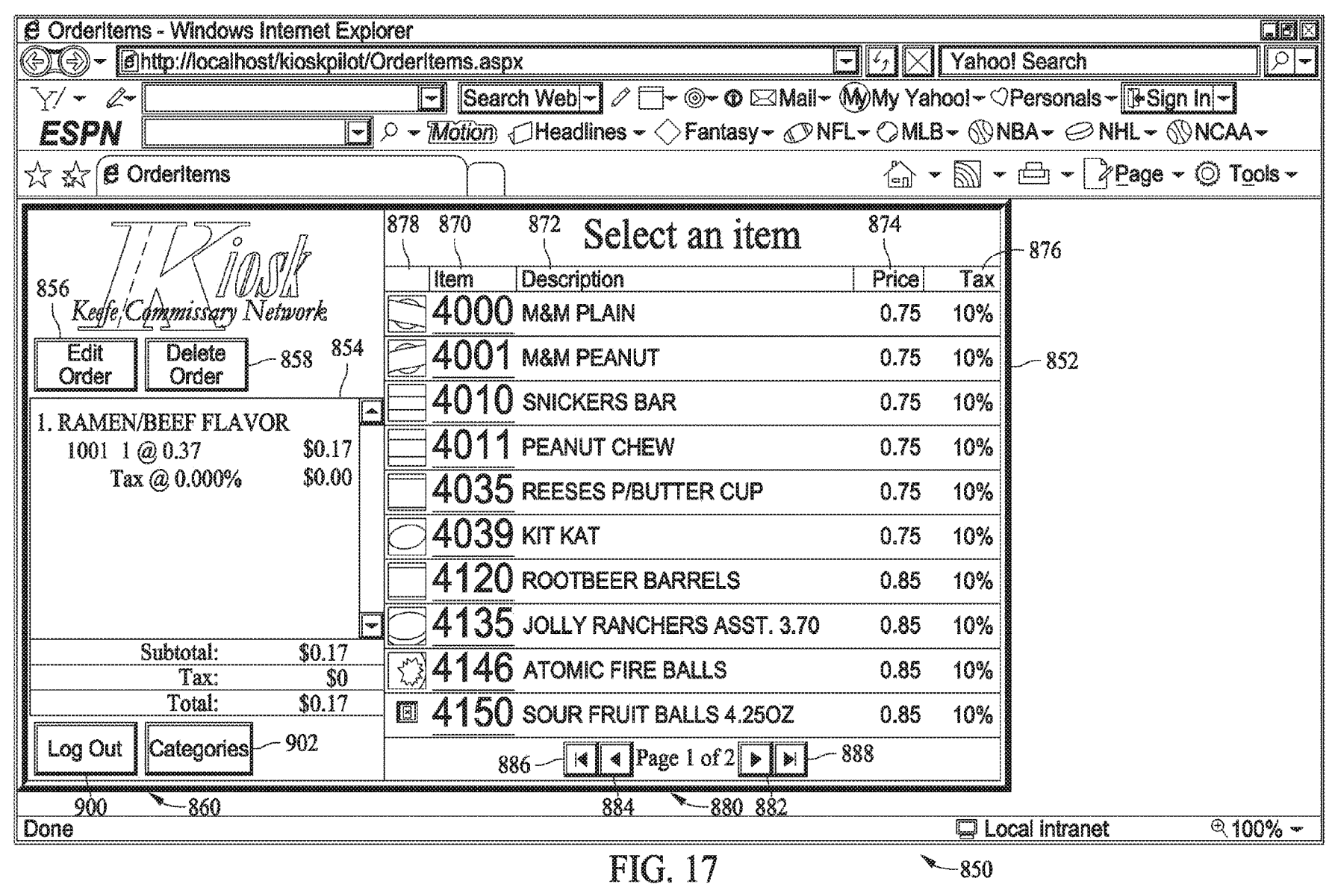

FIG. 17 is an example embodiment of a user interface displaying an item selection screen 850 for a user of the system. Item selection screen 850 includes an item section 852, a current order list 854, an edit order button 856, a delete order button 858, and navigational buttons 860. After a user selects a button corresponding to a category (as shown on category section 802 of FIG. 16), a list of items is presented.

Item section 852 includes a plurality of items predetermined to belong within a particular commissary product category. As shown in FIG. 17, the item section 852 may be organized in a table format, with rows corresponding to each item and columns corresponding to the details of each item. Item section 852 includes a column for an item number 870, a column for a description of the item 872, a column for a price of the item 874, a column indicating a tax percentage 876, and a column showing a picture or illustration corresponding to an item 878.

Item section 852 also includes page selection buttons 880. The page selection buttons 880 may include a next page button 882, a previous page button 884, a first page button 886, and a last page button 888. The page selection buttons 880 allow a user to move through the list of items for purchase when there is more than one page of items to view.

The current order list 854 includes a list of items currently selected by the inmate to be ordered. When a user selects the edit order button 856, algorithm 454 of FIG. 7 is executed to provide an inmate with order editing options. When a user selects the delete order button 858, algorithm 452 of FIG. 7 is executed to provide an inmate with order deletion options.

Navigational buttons 860, such as a log out button 900 and a category list button 902, allow an inmate to move through the privilege administration algorithm 350. The log out button 900 returns a user to the language selection screen 600 and the category list button 902 returns a user to the category selection screen 800.

Figure 18:
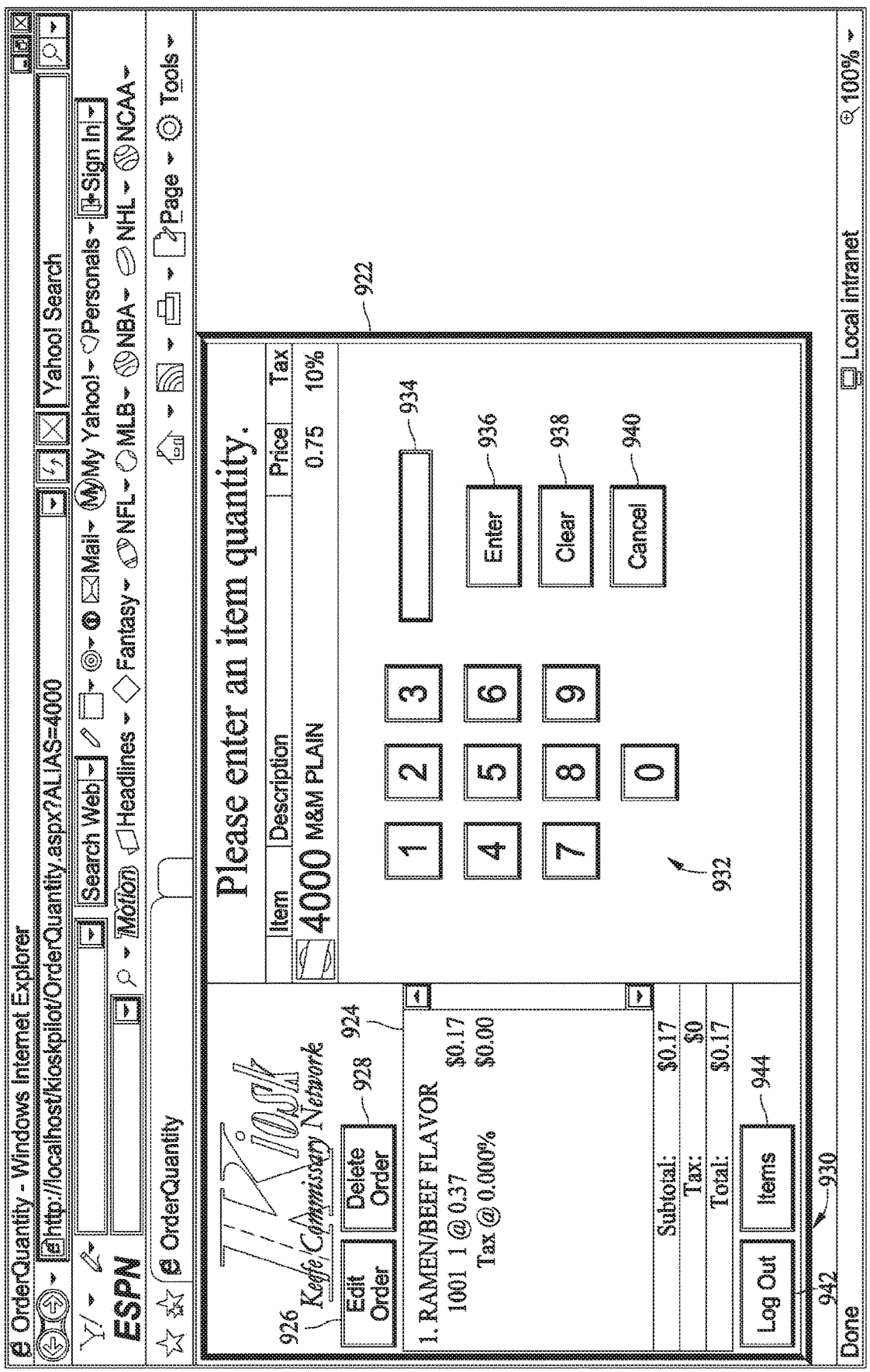

FIG. 18 is an example embodiment of a user interface displaying a quantity selection screen 920 for a user of the system. The quantity selection screen 920 includes a quantity entry section 922, a current order list 924, an edit order button 926, a delete order button 928, and navigational buttons 930.

In the exemplary embodiment of FIG. 18, the quantity entry section 922 includes a plurality of buttons 932 corresponding to numbers with which a user can enter a desired quantity of the selected item. The selected item is also displayed within the quantity entry section 922. The quantity entry section 922 also includes an entered quantity box 934. The entered quantity box 934 allows a user to view the numbers that have been input. An enter button 936 is also provided. The enter button 936 indicates to the system that the user has completed entry of the quantity. A clear button 938, when selected, clears the quantity box 934 and provides the inmate with an opportunity to re-start entering a quantity, for example, after an inmate realizes a wrong number has been entered. A cancel button 940 is provided to return a user to the item selection screen 850 should the user no longer want to enter a quantity for the selected item. Once a quantity is accepted for the selected item by the system, the quantity and item are indicated as accepted by being listed in the current order list 924.

The current order list 924 includes a list of items currently selected by the inmate to be ordered. When a user selects the edit order button 926, algorithm 454 of FIG. 7 is executed to provide an inmate with order editing options. When a user selects the delete order button 928, algorithm 452 of FIG. 7 is executed to provide an inmate with order deletion options.

Navigational buttons 930, such as a log out button 942 and an items button 944, allow an inmate to move through the privilege administration algorithm 350. The log out button 942 returns a user to the language selection screen 600 (see FIG. 10) and the items button 944 returns a user to the item selection screen 850 (see FIG. 17).

Figure 19:
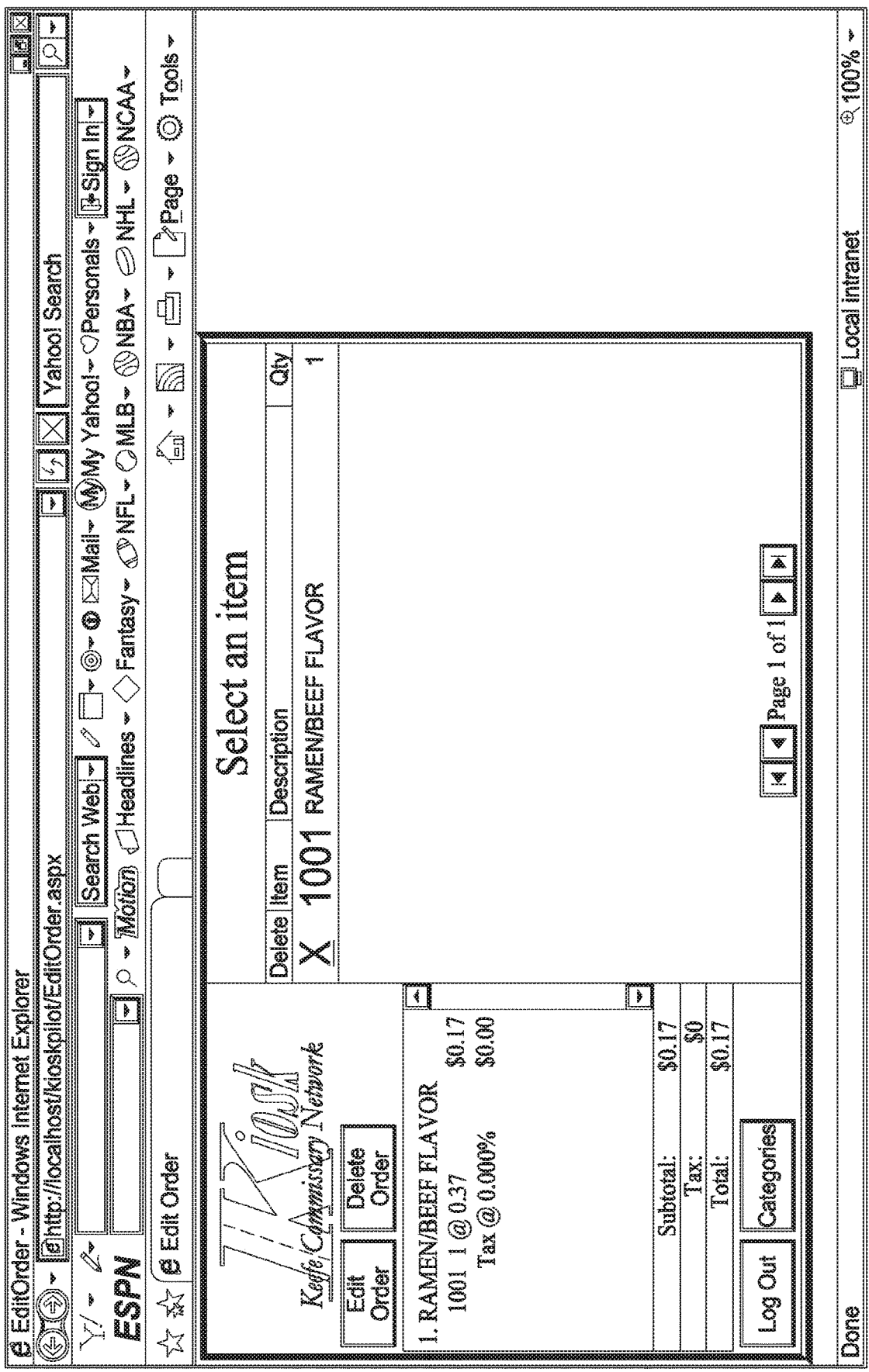

FIG. 19 is an example embodiment of a user interface displaying a selected order editing screen 960 for a user of the system. As described above, when a user selects the edit order button 806, 856 and 926 of FIGS. 16, 17, and 18 respectively, algorithm 454 of FIG. 7 is executed to provide an inmate with order editing options. Order editing screen 960 is an example embodiment of a user interface provided by algorithm 454.

Figure 20:
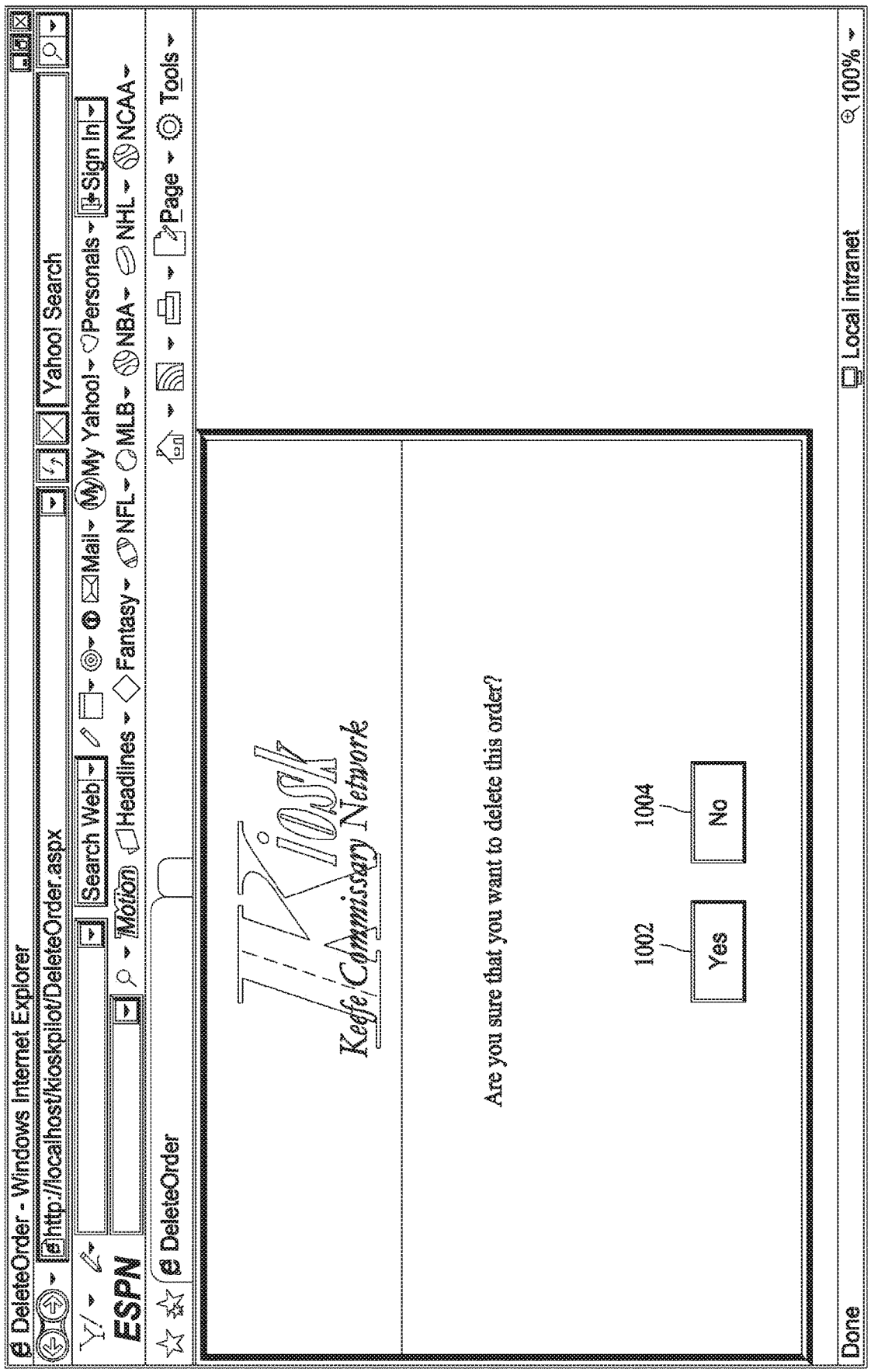

FIG. 20 is an example embodiment of a user interface displaying a selected order deletion screen 1000 for a user of the system. As described above, when a user selects the delete order button 808, 858, and 928 of FIGS. 16, 17, and 18 respectively, algorithm 452 of FIG. 7 is executed to provide an inmate with order deletion options. Selected order deletion screen 1000 is an example embodiment of a user interface provided by algorithm 454. Order deletion screen 1000 includes confirmation buttons 1002 and 1004. In the embodiment of FIG. 20, a user is presented with the question, "Are you sure that you want to delete this order?" If a user selects confirmation button 1002, which indicates the user is sure about deleting the order, the selected order is deleted and the user is returned to category selection screen 800. If a user selects confirmation button 1004, which indicates the user is not sure about deleting the order, the selected order is not deleted and the user is returned to category selection screen 800.

Figure 21:
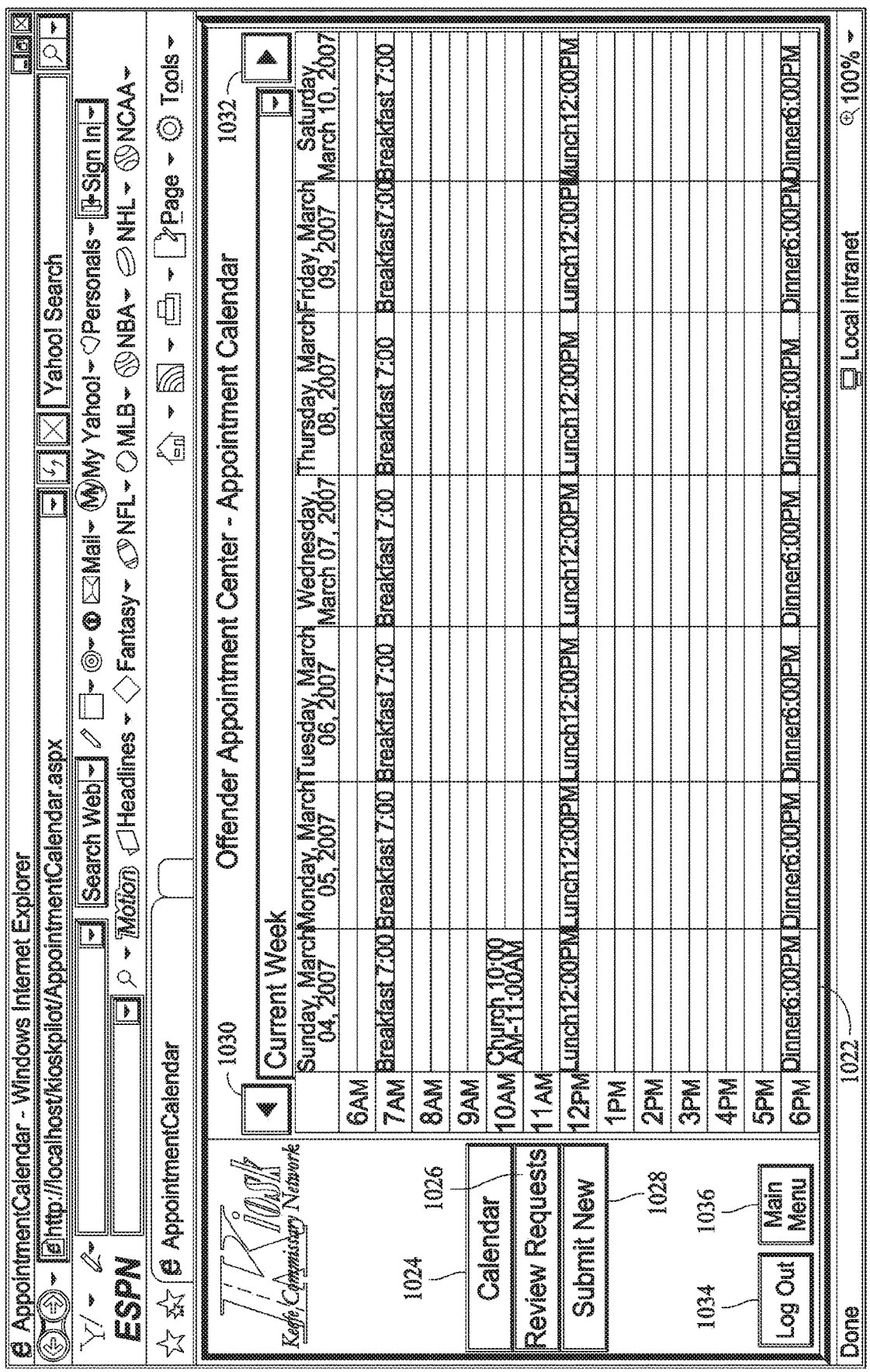

FIG. 21 is an example embodiment of a user interface displaying an appointment calendar screen 1020 for a user of the system. Appointment calendar screen 1020 includes a calendar view section 1022, a calendar view selection button 1024, a review requests button 1026, and a new request button 1028.

The calendar view section 1022 includes a collection of approved appointments scheduled during a selected time period. In the exemplary embodiment of FIG. 21, approved appointments scheduled during a one week period are displayed. Calendar view section 1022 also includes time period navigation buttons 1030, 1032. Time period navigation buttons 1030, 1032 allow an inmate to select other days to view by, for example, scrolling to days not previously displayed or selecting a new page to view containing a different week. Calendar view section 1022 may be organized in rows and columns, with each column representing one day and rows representing the hours within that day. An appointment displayed in a specific column and row pairing indicates that the inmate has an appointment on the day corresponding to the column and at the time corresponding to the row. Inmate appointments may include, but are not limited to, meals, exercise periods, educational classes, therapy sessions, and religious services.

In another embodiment of calendar view section 1022, approved appointments may be displayed that occur over a one month period, or any other period of time desired.

Appointment calendar screen 1020 also includes navigational buttons such as a log out button 1034 and a main menu button 1036, that allow an inmate to move through the privilege administration algorithm 350. The log out button 1034 returns a user to the language selection screen 600 and the main menu button 1036 returns a user to the main menu screen 700.

Figure 22:
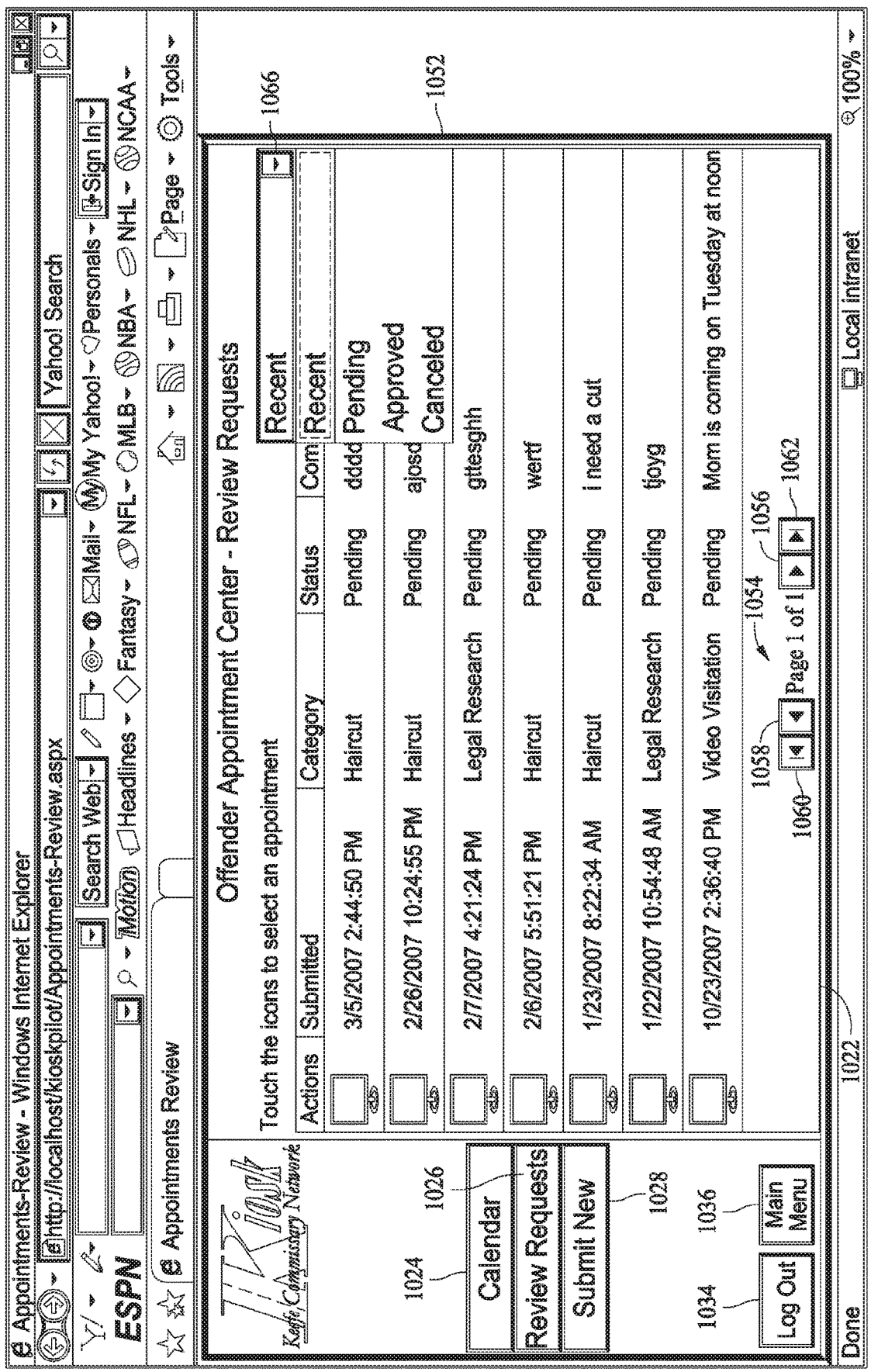

FIG. 22 is an example embodiment of a user interface displaying an appointment review screen 1050 for a user of the system. When a user selects the review request button 1026 (shown in FIGS. 21, 22, and 23), the appointment review screen 1050 is presented. The appointment review screen 1050 includes an appointment review section 1052, the calendar view selection button 1024, the review requests button 1026, and the new request button 1028.

Appointment review section 1052 includes a plurality of previously submitted appointment requests. As shown in FIG. 22, appointments may be organized in a table format, with rows corresponding to each appointment request and columns corresponding to the details of each appointment request. Appointment review section 1052 includes a column for date and time submitted, a column listing a category designation for the appointment, a column for a status of the request, and a column for comments.

Appointment review section 1052 also includes page selection buttons 1054. The page selection buttons 1054 may include a next page button 1056, a previous page button 1058, a first page button 1060, and a last page button 1062. The page selection buttons 1054 allow a user to move through the list of appointment requests.

Appointment review section 1052 also includes an organizational menu 1066. The organizational menu 1066 allows a user to select a type of appointment request, and only view that type of appointment request. The menu 1066 may include, but is not limited to, selections for recently added requests, pending requests, approved requests, and canceled requests.

When calendar view selection button 1024 is selected, calendar view screen 1020 is presented. When review requests button 1026 is selected, request review screen 1050 is presented. Also, when the new request button 1028 is pressed, an appointment request submission screen 1080 (see FIG. 23) is presented.

Appointment review screen 1050 also includes navigational buttons such as a log out button 1034 and a main menu button 1036, which allow an inmate to move through the privilege administration algorithm 350. The log out button 1034 returns a user to the language selection screen 600 and the main menu button 1036 returns a user to the main menu screen 700.

Figure 23:
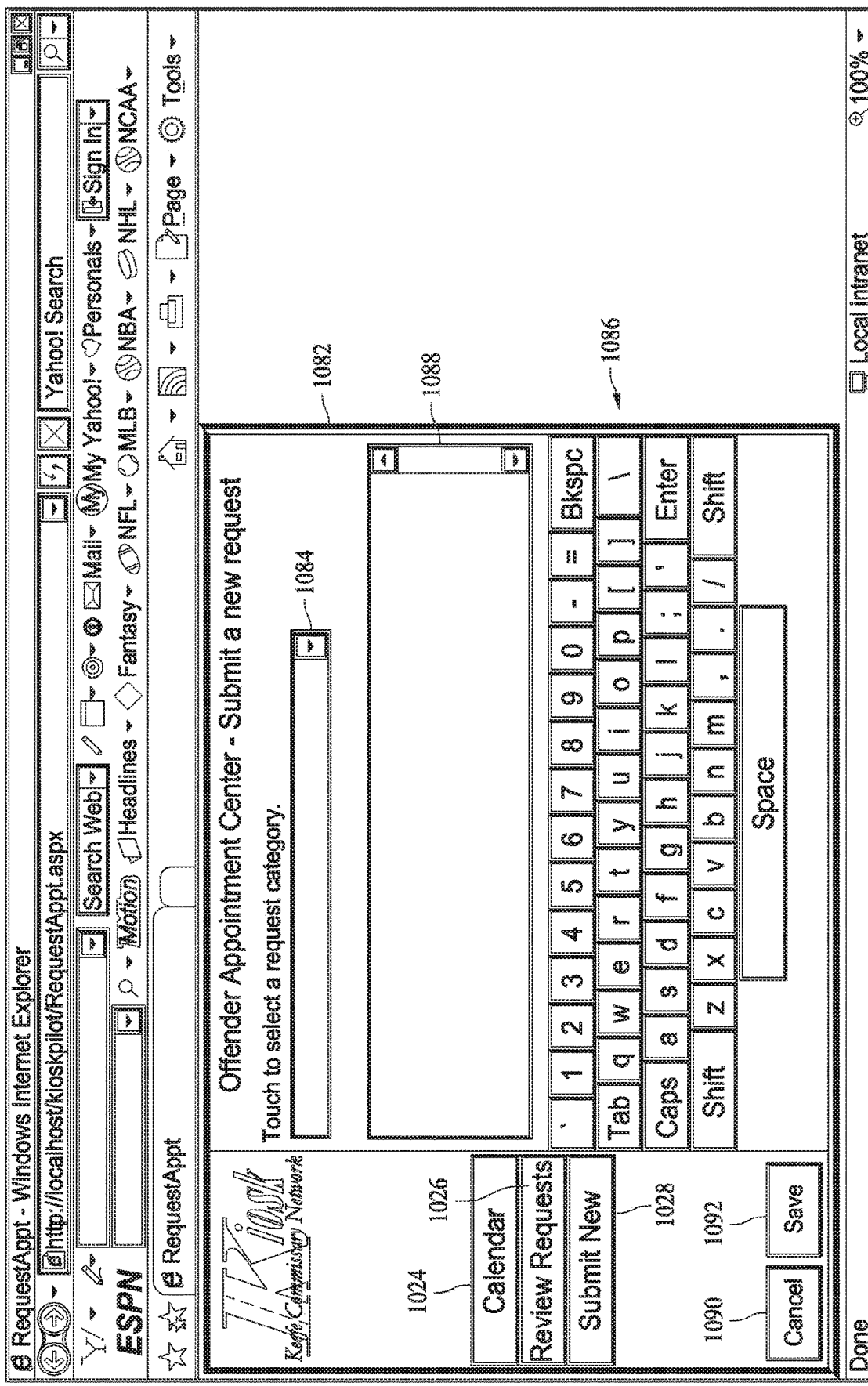

FIG. 23 is an example embodiment of a user interface displaying an appointment request submission screen 1080 for a user of the system. When a user selects the new request button 1028, the appointment request submission screen 1080 is provided to a user by the system. The appointment request submission screen 1080 includes an appointment request submission section 1082, the calendar view selection button 1024, the review requests button 1026, and the new request button 1028. The calendar view selection button 1024, the review requests button 1026, and the new request button 1028 are described above.

The appointment submission section 1082 includes an appointment category menu 1084. Appointment category menu 1084 allows a user to select from a plurality of appointment categories, for example, by using a pull-down menu. In the embodiment of FIG. 23, the appointment submission section 1082 also includes character entry buttons 1086 that allow a user to enter the details of an appointment request. As the details are entered by a user, the details are displayed in an appointment request text box 1088.

Appointment request submission screen 1080 also includes a cancel button 1090 and a save button 1092. If a user selects the cancel button 1090, the user is returned to review request screen 1050. If a user selects the save button 1092, the information input on screen 1080 is saved to a database and the user is returned to review request screen 1050.

Figure 24:
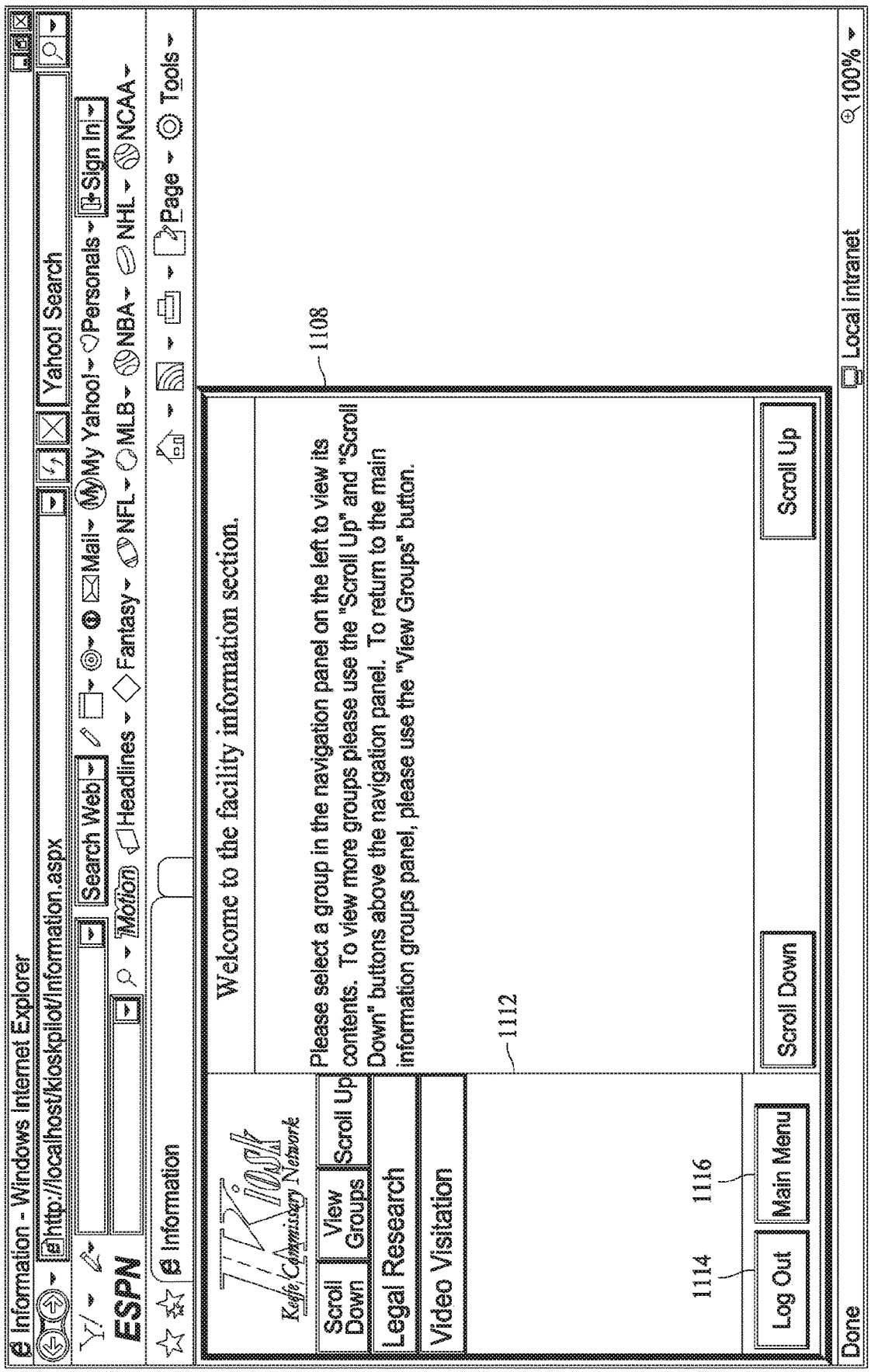

FIG. 24 is an example embodiment of a user interface displaying a facility information main screen 1100 for a user of the system. Facility information main screen 1100 includes a facility information section 1108, an information groups section 1112, and navigational option buttons 1114 and 1116.

The facility information section 1108 is a display area where facility administrators can provide information to inmates. The information provided to inmates is divided into groups, which are displayed in the groups section 1112. Both facility information section 1108 and groups section 1112 include scroll buttons such that a user can view information or groups not able to fit on one screen.

Facility information main screen 1100 also includes navigational buttons such as a log out button 1114 and a main menu button 1116, which allow a user to move through the privilege administration algorithm 350. The log out button 1034 returns a user to the language selection screen 600 and the main menu button 1036 returns a user to the main menu screen 700.

Figure 25:
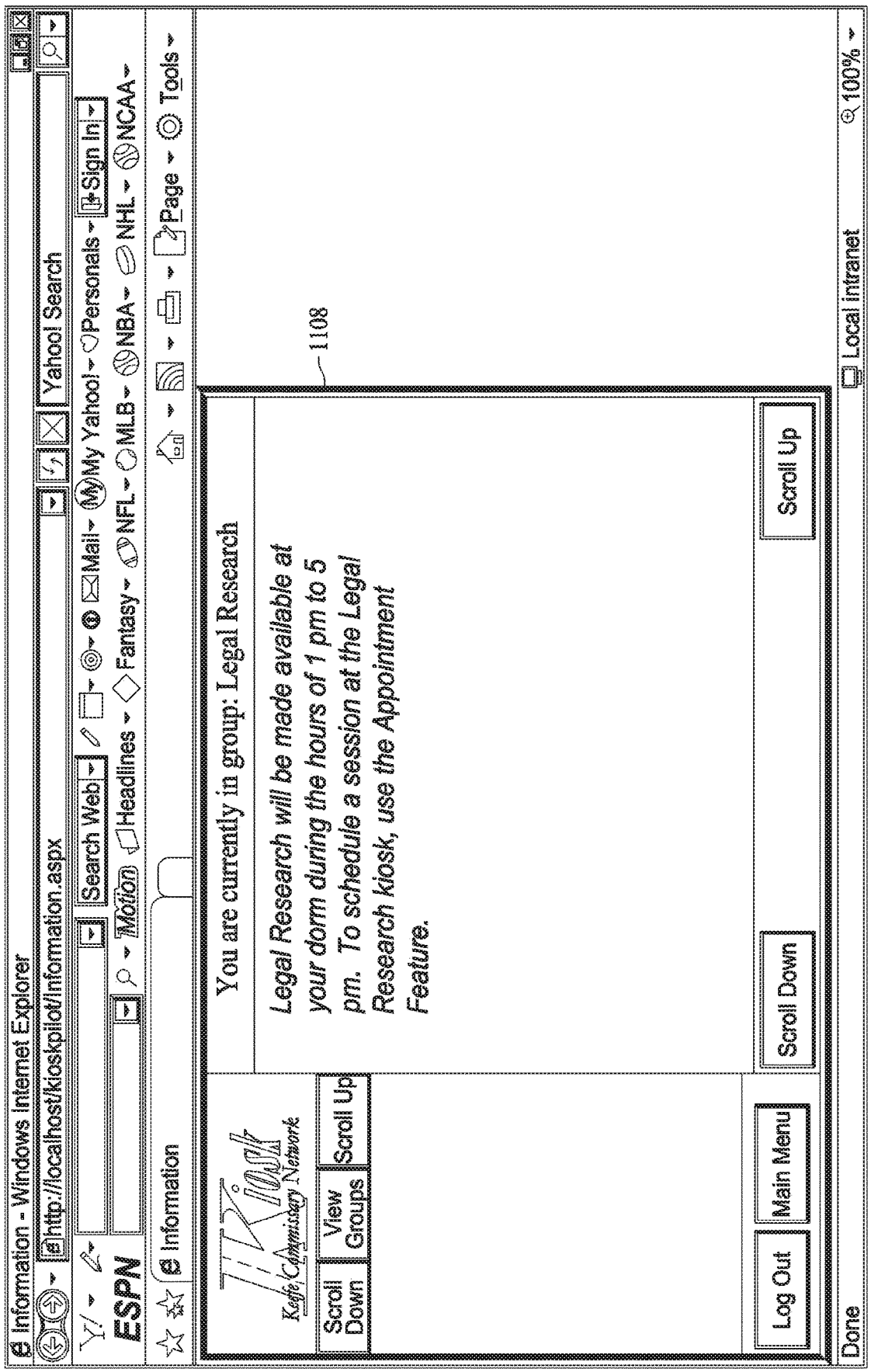

FIG. 25 is an example embodiment of a user interface displaying a facility information screen 1100 for a user of the system. Screen 1100 would be presented after a user selected "Legal Research" from the plurality of facility information groups shown in groups section 1112 (see FIG. 24). Information related to "Legal Research" is displayed in facility information section 1108.

Figure 26:
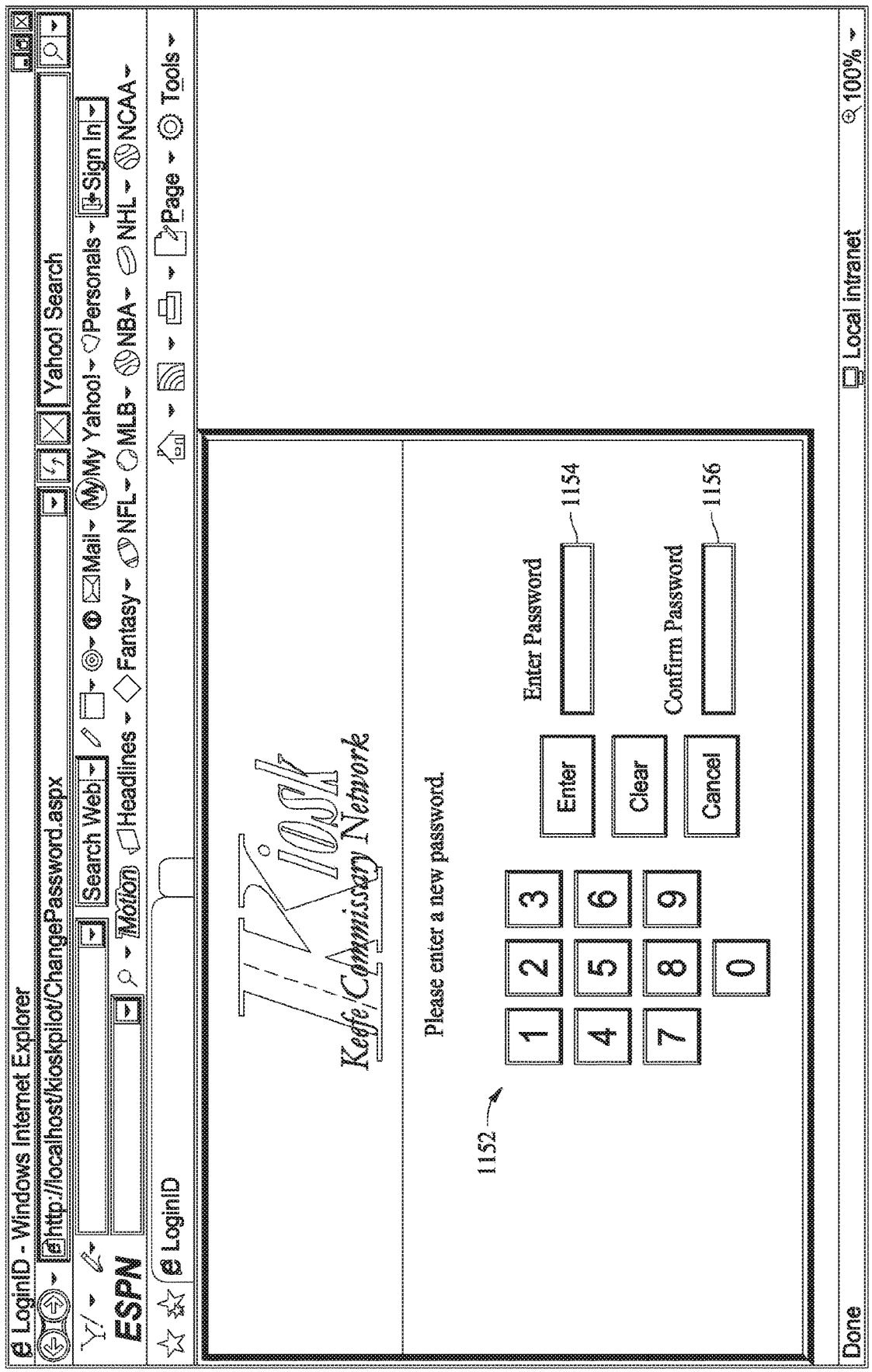

FIG. 26 is an example embodiment of a user interface displaying a new password entry screen 1150 for a user of the system. If an inmate selects change password button 728 (see FIG. 14), new password entry screen 1150 is displayed. New password entry screen 1150 includes character entry buttons 1152, a view password entry box 1154 and a confirm password entry box 1156. Once a user enters a new password, and confirms the new password by entering the same password a second time, the system saves the new password in a database and returns to main menu screen 700.

The terms "user" and "inmate", as used herein, are used interchangeably. The system 150 is configured for use at correctional facilities where inmates may use the system, however, the system will also function if used by anyone else including correctional facility administrators, guards, and guests.

The benefits and advantages of the invention are now believed to be amply demonstrated in the various embodiments disclosed.

The application of inmate restrictions is automated by the inmate privilege administration system 150. Because an inmate's identity has been verified once the inmate is logged on to the system 150, the system 150 applies a record of the inmate's restrictions before a commissary order from the inmate is submitted. The system 150 also informs the inmate of the applied restriction. This automation is especially advantageous for larger inmate populations having significant turnover and change of individuals in the population and/or frequent changes in inmate restrictions.

Another benefit of the invention is that by providing inmates with information such as account information, transaction history, the status of submitted privilege requests, and facility information, the number of inmate questions to facility staff regarding these topics may be reduced. For example, an inmate who views transaction history screen 750 (see FIG. 15) can determine how his available funds (shown in account information section 752) reached the indicated amount. A reduction in questions to facility staff regarding inmate privileges is beneficial for multiple reasons including, but not limited to, easing the job of the facility staff and possibly preventing inmate hostility caused by not receiving the information desired in a timely fashion.

Unlike printed catalogs or books containing items for sale at the commissary, each time an inmate views the category selection screen 800 and the item selection screen 850, the screens are up to date with a latest version of the categories and items available for purchase. Also, by presenting a current order list, for example, the current order list 804 shown in FIG. 16, an inmate is able to review the entered items and the entered quantities of those items to ensure they are an accurate reflection of the inmate's desired order. Furthermore, by providing an inmate with multiple editing and deletion options, for example, the edit order screen 960 of FIG. 19 and the delete order screen 1000 of FIG. 20, an inmate may correct errors, either inmate errors or system errors, before logging out of the system 150. By providing the inmate with the editing and deletion options, the amount of time taken by facility staff to correct such errors in the ordering process is reduced.

Also, through the facility information screen 1100, an accurate and timely dissemination of facility information and notices is available to inmates. The accurate and timely dissemination of facility information and notices is in contrast to posted message boards and the like in public hallways, entryways, and gathering rooms, which may quickly become outdated, illegible, difficult to remember, or unhelpful to many inmates. The facility information screen 1100, in contrast to loose hardcopy paper materials that may not be effective due to inmates discarding or losing the paper notices, or the inmates never receiving the paper notices at all, provides a centralized location where inmates can receive facility information and notices.

While the invention has been described in terms of various specific embodiments, those skilled in the art will recognize that the invention can be practiced with modification within the spirit and scope of the claims.

What is claimed is:

1. A computer system to reliably evaluate inmate privilege requests across an inmate population in a correctional facility, the system comprising:

at least one computing device having access to a computer database including stored inmate privilege data and information for a plurality of different inmate privileges available to at least some of the inmates in the inmate population and stored updated inmate privilege restriction data and information applicable to selected ones of the inmate population, wherein the inmate privilege restriction data and information reflect changeable health-based, security-based, or behavior-based considerations over time in the correctional facility, wherein the at least one computing device is configured to:

visually present, based on the inmate privilege data and information and via the at least one computing device, the plurality of different inmate privileges available to an identified inmate;

receive at least one selection input from the visually presented plurality of different inmate privileges available to the identified inmate;

automatically compare, at a first time instance, the at least one selection input to any of the updated inmate privilege restriction data and information applicable to the identified inmate to ascertain whether the at least one selection input violates the updated inmate privilege restriction data and information;

store the at least one selection input as a pending privilege request until a subsequent processing time only when the at least one selection input does not violate the updated inmate privilege restriction data and information;

automatically compare, at the subsequent processing time, the stored pending privilege request to any of the updated inmate privilege restriction data and information applicable to the identified inmate to ascertain whether the stored pending privilege request violates the updated inmate privilege restriction data and information; and approve the stored privilege request for the benefit of the identified inmate only when the stored privilege request does not violate the updated inmate privilege restriction data and information at the subsequent processing time.

2. The computer system of claim 1, wherein the visually presented plurality of different inmate privileges available to an identified inmate include at least one of a plurality of commissary item order options, a plurality of appointment options, or a plurality of facility privileges.

3. The computer system of claim 2, wherein the plurality of commissary item order options include commissary items selected from the group of food items, beverage items, hygiene items, clothing items and electronic items.

4. The computer system of claim 2, wherein the plurality of appointment options are selected from the group of a hygiene appointment, a legal research appointment, a visitation appointment, an exercise appointment, a class appointment, a therapy session appointment, a doctor's appointment, and a religious services appointment.

5. The computer system of claim 2, wherein the plurality of facility privileges are selected from the group of haircuts, library time including legal research, visitation, exercise periods, educational classes, concerts or performances, group activities, and holiday events.

6. The computer system of claim 1, wherein the at least one computing device is further configured to visually present a financial transaction account history including applicable charges for pending privilege requests and approved privilege requests of the identified inmate.

7. The computer system of claim 1, wherein the at least one computing device is further configured to receive an edited selection input, and to automatically compare the edited selection input to any of the updated inmate privilege restriction data and information applicable to the identified inmate to ascertain whether the at least one selection input violates the updated inmate privilege restriction data and information.

8. The computer system of claim 1, wherein the at least one computing device includes a server device and a user device.

9. The computer system of claim 8, wherein the user device is accessible to an inmate in the correctional facility.

10. The computer system of claim 8, wherein the user device is a computer kiosk.

11. The computer system of claim 8, wherein the user device includes a touch screen.

12. The computer system of claim 1, wherein the at least one computing device is configured to store pending privilege requests for plurality of identified inmates as a batch until the subsequent processing time.

13. The computer system of claim 1, wherein the at least one computing device is configured to uniquely identity an inmate accessing the at least one computing device.

14. A computer system to reliably evaluate inmate privilege requests across an inmate population in a correctional facility, the system comprising:

at least one computing device having access to stored inmate privilege data and information for a plurality of different inmate privileges available to at least some of the inmates in the inmate population and stored updated inmate privilege restriction data and information applicable to selected ones of the inmate population and reflecting changeable health-based, security-based, or behavior-based considerations over time in the correctional facility, wherein the at least one computing device is configured to:

visually present, based on the stored inmate privilege data, the plurality of different inmate privileges available to an identified inmate;

wherein the plurality of different inmate privileges available to an inmate are determined by the correctional facility and are selected from the group of a commissary food item order, a commissary beverage item order, a commissary hygiene item order, a commissary clothing item order, a commissary electronic item order, a hygiene appointment, a legal research appointment, a visitation appointment, an exercise appointment, a class appointment, a therapy session appointment, a doctor's appointment, a religious services appointment, a facility haircut offering, a facility library time including legal research, a facility visitation session, a facility exercise period session, a facility educational class, a facility concert or performance, a facility group activity, and a facility holiday event;

receive, via the at least one computing device, at least one selection input from the visually presented plurality of different inmate privileges available to the identified inmate; and perform a two-step validation of the at least one selection input prior to approving the at least one selection input for the benefit of the identified inmate, the first step being undertaken at a time of submission of the at least one selection input and the second step being undertaken at a processing time subsequent to the time of submission of the at least one selection input, and at each of the first step and the second step the at least one computing device is further configured to:

automatically compare the at least one selection input to any of the updated inmate privilege restriction data and information applicable to the identified inmate to ascertain whether the at least one selection input violates the updated inmate privilege restriction data and information; and automatically account for any applicable financial charge for the at least one selection input when the at least one selection input does not violate the updated inmate privilege restriction data and information.

15. The computer system of claim 14, wherein the at least one computing device includes a server device and a user device.

16. The computer system of claim 15, wherein the user device is accessible to an inmate in the correctional facility.

17. The computer system of claim 15, wherein the user device is a computer kiosk.

18. The computer system of claim 15, wherein the user device includes a touch screen.

19. The computer system of claim 14, wherein the at least one computing device is configured to store pending privilege requests for plurality of identified inmates as a batch for approval at the second step.

20. The computer system of claim 14, wherein the at least one computing device is configured to uniquely identity an inmate accessing the at least one computing device.

21. A computer-implemented method of reliably evaluating inmate privilege requests across an inmate population in a correctional facility, the method implemented using at least one computing device having access to stored inmate privilege data and information for a plurality of different inmate privileges available to at least some of the inmates in the inmate population and stored updated inmate privilege restriction data and information applicable to selected ones of the inmate population and reflecting changeable health-based, security-based, or behavior-based considerations over time in the correctional facility, wherein the method comprises:

visually presenting, based on the stored inmate privilege data and information and via the at least one computing device, the plurality of different inmate privileges available to an identified inmate;

wherein the plurality of different inmate privileges available to an inmate are determined by the correctional facility and are selected from the group of a commissary food item order, a commissary beverage item order, a commissary hygiene item order, a commissary clothing item order, a commissary electronic item order, a hygiene appointment, a legal research appointment, a visitation appointment, an exercise appointment, a class appointment, a therapy session appointment, a doctor's appointment, a religious services appointment, a facility haircut offering, a facility library time including legal research, a facility visitation session, a facility exercise period session, a facility educational class, a facility concert or performance, a facility group activity, and a facility holiday event;

receiving, via the at least one computing device, at least one selection input from the visually presented plurality of different inmate privileges available as a privilege request; and performing, via the at least one computing device, a two-step validation of the at least one selection input prior to approving the at least one selection time for the benefit of the identified inmate, the first step being undertaken at a time of submission of the at least one selection input and the second step being undertaken at a processing time subsequent to the time of submission of the at least one selection input, wherein each of the first step and the second step comprises:

automatically comparing the at least one selection input to any of the updated inmate privilege restriction data and information applicable to the identified inmate to ascertain whether the at least one selection input violates the updated inmate privilege restriction data and information; and automatically accounting for any applicable financial charge for the at least one selection input when the at least one selection input does not violate the updated inmate privilege restriction data and information.

22. The method of claim 20, wherein the at least one computing device is configured to store pending privilege requests for plurality of identified inmates as a batch until the subsequent processing time.

23. The computer system of claim 20, wherein the at least one computing device is configured to uniquely identity an inmate accessing the at least one computing device.

* * * * *